US012688379B2

(12) United States Patent
Rapaport-Rom et al.

(10) Patent No.: US 12,688,379 B2
(45) Date of Patent: Jul. 21, 2026

(54) SYSTEM AND METHOD FOR TRACING MEMBERS OF AN ANIMAL POPULATION

(71) Applicant: IdentiGEN Limited, Dublin (IE)

(72) Inventors: Yuval Rapaport-Rom, Netanya (IL);
Robert William Mitchell, Surrey (GB);
Matteo Ratti, Netanya (IL)

(73) Assignee: IdentiGEN Limited, Dublin (IE)

( * ) Notice: Subject to any disclaimer, the term of this patent is extended or adjusted under 35 U.S.C. 154(b) by 0 days.

(21) Appl. No.: 19/194,022

(22) Filed: Apr. 30, 2025

(65) Prior Publication Data

US 2025/0272520 A1 Aug. 28, 2025

Related U.S. Application Data

(63) Continuation of application No. 18/604,541, filed on Mar. 14, 2024, now Pat. No. 12,321,808, which is a
(Continued)

(30) Foreign Application Priority Data

Nov. 25, 2020 (IL) .......................................... 278965

(51) Int. Cl.
*G06K 7/10* (2006.01)
*A01K 11/00* (2006.01)

(52) U.S. Cl.
CPC ........ *G06K 7/10297* (2013.01); *A01K 11/006* (2013.01)

(58) Field of Classification Search
CPC ........................... G06K 7/10297; A01K 11/606
(Continued)

(56) References Cited

U.S. PATENT DOCUMENTS 85,575 A 1/1869 Drake
1,016,752 A 2/1912 Leith
(Continued)

FOREIGN PATENT DOCUMENTS

AU 199534570 10/1994
AU 3457095 A 5/1996
(Continued)

OTHER PUBLICATIONS

Christian Pahl, Eberhard Hartung, Anne Grothmann, Katrin Mahlkow-Nerge, Angelika Haeussermann, Rumination activity of dairy cows in the 24 hours before and after calving, Journal of Dairy Science, vol. 97, Issue 11, 2014, pp. 6935-6941.
(Continued)

*Primary Examiner* — Ahshik Kim
(74) *Attorney, Agent, or Firm* — S.J. INTELLECTUAL PROPERTY LTD.

(57) ABSTRACT

A system for tracing members of an animal population throughout a process including moving at least some of the members, between (a) a plurality of physically separate locations and (b) one or more virtual stations, in a given order, the system comprising: a data repository comprising one or more location change records; and a processing circuitry configured to perform at least one of the following: analyze the data repository to check compliance of a subset of the animal population with a population compliance goal, wherein the subset comprising a plurality of the members; or (i) obtain a population indication request, requesting indications of the members that meet a criterion, (ii) analyze the data repository to identify the members that meet the criterion, and (iii) provide an indication of the members that meet the criterion.

20 Claims, 4 Drawing Sheets

Related U.S. Application Data continuation of application No. 17/626,831, filed as application No. PCT/IL2021/051226 on Oct. 18, 2021, now Pat. No. 11,960,957.

(60) Provisional application No. 63/190,243, filed on May 19, 2021.

(58) Field of Classification Search
USPC ........................................................ 235/380
See application file for complete search history.

(56) References Cited

U.S. PATENT DOCUMENTS

| | | | |
|---|---|---|---|
| 1,188,510 A | 6/1916 | Timson | |
| 1,364,137 A | 1/1921 | Pannier | |
| 1,759,400 A | 5/1930 | Hobbs | |
| 1,843,314 A | 2/1932 | Berntson et al. | |
| 1,863,037 A | 6/1932 | Archbold | |
| 2,078,827 A | 4/1937 | Ketchum | |
| 2,420,020 A | 5/1947 | Snell | |
| 2,553,400 A | 5/1951 | Blair | |
| 2,570,048 A | 10/1951 | Cooke et al. | |
| 3,091,770 A | 6/1963 | Mcmurray et al. | |
| 3,261,243 A | 7/1966 | Ellison | |
| 3,596,541 A | 8/1971 | Bieganski | |
| 3,812,859 A | 5/1974 | Murphy et al. | |
| 3,884,100 A | 5/1975 | Fideldy | |
| 3,981,209 A | 9/1976 | Caroff | |
| 4,120,303 A | 10/1978 | Villa-Massone et al. | |
| 4,121,591 A | 10/1978 | Hayes | |
| 4,281,657 A | 8/1981 | Ritchey | |
| 4,323,183 A | 4/1982 | Duchin | |
| 4,497,321 A | 2/1985 | Fearing et al. | |
| 4,516,577 A | 5/1985 | Scott et al. | |
| 4,531,520 A | 7/1985 | Reggers et al. | |
| 4,552,147 A | 11/1985 | Gardner et al. | |
| 4,618,861 A | 10/1986 | Gettens | |
| 4,666,436 A | 5/1987 | McDonald et al. | |
| 4,672,966 A | 6/1987 | Haas, Jr. | |
| 4,696,119 A | 9/1987 | Howe et al. | |
| 4,716,899 A | 1/1988 | Huenefeld et al. | |
| 4,819,639 A | 4/1989 | Gardner | |
| 4,821,683 A | 4/1989 | Veldman | |
| 4,943,294 A | 7/1990 | Knapp | |
| 5,022,253 A | 6/1991 | Parlatore | |
| 5,056,385 A | 10/1991 | Petersen | |
| 5,141,514 A | 8/1992 | van Amelsfort | |
| 5,154,721 A | 10/1992 | Perez | |
| 5,267,464 A | 12/1993 | Cleland | |
| 5,509,291 A | 4/1996 | Nilsson et al. | |
| 5,651,791 A | 7/1997 | Zavlodaver et al. | |
| 5,771,837 A | 6/1998 | van der Lely | |
| 5,778,820 A | 7/1998 | van der Lely et al. | |
| 6,007,548 A | 12/1999 | Ritchey | |
| 6,016,769 A | 1/2000 | Forster | |
| 6,043,748 A | 3/2000 | Touchton et al. | |
| 6,053,926 A | 4/2000 | Luehrs | |
| 6,095,915 A | 8/2000 | Battista et al. | |
| 6,099,482 A | 8/2000 | Brune et al. | |
| 6,100,804 A | 8/2000 | Brady et al. | |
| 6,113,539 A | 9/2000 | Ridenour | |
| 6,114,957 A | 9/2000 | Westrick et al. | |
| 6,145,225 A | 11/2000 | Ritchey | |
| 6,166,643 A | 12/2000 | Janning et al. | |
| 6,172,640 B1 | 1/2001 | Durst et al. | |
| 6,232,880 B1 | 5/2001 | Anderson et al. | |
| 6,235,036 B1 | 5/2001 | Gardner et al. | |
| 6,271,757 B1 | 8/2001 | Touchton et al. | |
| 6,297,739 B1 | 10/2001 | Small | |
| 6,310,553 B1 | 10/2001 | Dance | |
| 6,375,612 B1 | 4/2002 | Guichon et al. | |
| 6,402,692 B1 | 6/2002 | Morford | |
| 6,497,197 B1 | 12/2002 | Huisma | |
| 6,502,060 B1 | 12/2002 | Christian | |
| 6,510,630 B1 | 1/2003 | Gardner | |
| 6,516,744 B1 | 2/2003 | Bjork | |
| 6,535,131 B1 | 3/2003 | Bar-Shalom et al. | |
| 6,569,092 B1 | 5/2003 | Booker | |
| 6,659,039 B1 | 12/2003 | Larsen | |
| 6,868,804 B1 | 3/2005 | Huisma et al. | |
| 7,016,730 B2 | 3/2006 | Ternes et al. | |
| 7,046,152 B1 | 5/2006 | Peinetti et al. | |
| 7,137,359 B1 | 11/2006 | Braden | |
| 7,209,775 B2 | 4/2007 | Bae et al. | |
| 7,282,028 B2 | 10/2007 | Kim et al. | |
| 7,296,539 B2 | 11/2007 | Iljas | |
| 7,380,518 B2 | 6/2008 | Kates | |
| 7,705,736 B1 | 4/2010 | Kedziora | |
| 7,721,675 B2 | 5/2010 | Kaever | |
| 7,843,350 B2 | 11/2010 | Geissler et al. | |
| 7,937,861 B1 | 5/2011 | Zacher | |
| 8,005,624 B1 | 8/2011 | Starr | |
| 8,232,888 B2 | 7/2012 | Frederick et al. | |
| 8,266,990 B1 | 9/2012 | Janson | |
| 8,305,220 B2 | 11/2012 | Gibson | |
| 8,478,389 B1 | 7/2013 | Brockway et al. | |
| 8,622,929 B2 | 1/2014 | Wilson et al. | |
| 8,763,557 B2 | 7/2014 | Lipscomb et al. | |
| 8,939,111 B2 | 1/2015 | Berntsen | |
| 8,950,357 B2 | 2/2015 | Rajkondawar | |
| 8,955,462 B1 | 2/2015 | Golden et al. | |
| 9,195,866 B1 | 11/2015 | Mehranfar et al. | |
| 9,215,862 B2 | 12/2015 | Bladen et al. | |
| 9,392,767 B2 | 7/2016 | Johnson, III et al. | |
| 9,392,946 B1 | 7/2016 | Sarantos et al. | |
| 9,449,487 B1 | 9/2016 | Spitalny | |
| 9,603,342 B2 | 3/2017 | Rajkondawar | |
| 9,648,849 B1 | 5/2017 | Vivathana | |
| 9,654,925 B1 | 5/2017 | Solinsky et al. | |
| 9,693,536 B1 | 7/2017 | Dana | |
| 9,717,216 B1 | 8/2017 | Schlachta et al. | |
| 9,743,643 B1 | 8/2017 | Kaplan et al. | |
| 9,778,111 B2 | 10/2017 | Stanchina et al. | |
| 9,848,577 B1 | 12/2017 | Brandao et al. | |
| 9,861,080 B1 | 1/2018 | Hathway et al. | |
| 10,021,857 B2 | 7/2018 | Bailey et al. | |
| 10,039,263 B2 | 8/2018 | Teychene et al. | |
| 10,039,267 B1 | 8/2018 | Thiex | |
| 10,045,511 B1 | 8/2018 | Yarden et al. | |
| 10,064,391 B1 | 9/2018 | Riley | |
| 10,091,972 B1 | 10/2018 | Jensen et al. | |
| 10,231,442 B1 | 3/2019 | Chang et al. | |
| 10,242,547 B1 | 3/2019 | Struhsaker et al. | |
| 10,264,762 B1 | 4/2019 | Lamb | |
| 10,352,759 B1 | 7/2019 | Jensen | |
| 10,446,006 B1 | 10/2019 | Johnson, Jr. et al. | |
| 10,512,430 B1 | 12/2019 | Hladio | |
| 10,588,295 B1 | 3/2020 | Riley | |
| 10,628,756 B1 | 4/2020 | Kuper et al. | |
| 10,638,726 B1 | 5/2020 | Makarychev et al. | |
| 10,691,674 B2 | 6/2020 | Leong et al. | |
| 10,918,080 B2 | 2/2021 | Youn et al. | |
| 10,986,816 B2 | 4/2021 | Brayer | |
| 11,832,584 B2 | 12/2023 | Wooten | |
| 2001/0027751 A1 | 10/2001 | Van den Berg | |
| 2002/0010390 A1 | 1/2002 | Guice et al. | |
| 2002/0021219 A1 | 2/2002 | Edwards et al. | |
| 2002/0050248 A1 | 5/2002 | Pratt | |
| 2002/0091326 A1 | 7/2002 | Hashimoto et al. | |
| 2002/0095828 A1 | 7/2002 | Koopman et al. | |
| 2002/0111819 A1 | 8/2002 | Li et al. | |
| 2002/0154015 A1 | 10/2002 | Hixson | |
| 2002/0158765 A1 | 10/2002 | Pape et al. | |
| 2003/0004652 A1 | 1/2003 | Brunner et al. | |
| 2003/0023517 A1 | 1/2003 | Marsh et al. | |
| 2003/0062001 A1 | 4/2003 | Andersson | |
| 2003/0066491 A1 | 4/2003 | Stampe | |
| 2003/0144926 A1 | 7/2003 | Bodin et al. | |
| 2003/0146284 A1 | 8/2003 | Schmit et al. | |
| 2003/0149526 A1 | 8/2003 | Zhou et al. | |
| 2003/0154925 A1 | 8/2003 | Van Den Berg | |
| 2003/0172560 A1 | 9/2003 | Sanjurjo et al. | |
| 2003/0177025 A1 | 9/2003 | Curkendall et al. | |
| 2003/0201931 A1 | 10/2003 | Durst et al. | |

(56) References Cited

U.S. PATENT DOCUMENTS

| | | |
|---|---|---|
| 2003/0208157 A1 | 11/2003 | Eidson et al. |
| 2003/0221343 A1 | 12/2003 | Volk et al. |
| 2003/0229452 A1 | 12/2003 | Lewis et al. |
| 2004/0066298 A1 | 4/2004 | Schmitt et al. |
| 2004/0078390 A1 | 4/2004 | Saunders |
| 2004/0118920 A1 | 6/2004 | He |
| 2004/0123810 A1 | 7/2004 | Lorton et al. |
| 2004/0177011 A1 | 9/2004 | Ramsay et al. |
| 2004/0201454 A1 | 10/2004 | Waterhouse et al. |
| 2004/0244699 A1 | 12/2004 | Schwering |
| 2005/0010333 A1 | 1/2005 | Lorton et al. |
| 2005/0026181 A1 | 2/2005 | Davis et al. |
| 2005/0069890 A1 | 3/2005 | Mabilat et al. |
| 2005/0097997 A1 | 5/2005 | Hile |
| 2005/0108912 A1 | 5/2005 | Bekker |
| 2005/0115508 A1 | 6/2005 | Little |
| 2005/0126498 A1 | 6/2005 | Bosma |
| 2005/0128086 A1 | 6/2005 | Brown et al. |
| 2005/0139168 A1 | 6/2005 | Light et al. |
| 2005/0145187 A1 | 7/2005 | Gray |
| 2005/0223997 A1 | 10/2005 | Umegard |
| 2005/0241589 A1 | 11/2005 | Forster |
| 2005/0273117 A1 | 12/2005 | Teychene |
| 2005/0279287 A1 | 12/2005 | Kroeker |
| 2005/0284381 A1 | 12/2005 | Bell et al. |
| 2006/0011145 A1 | 1/2006 | Kates |
| 2006/0049250 A1 | 3/2006 | Sullivan |
| 2006/0052986 A1 | 3/2006 | Rogers et al. |
| 2006/0064325 A1 | 3/2006 | Matsumoto et al. |
| 2006/0087440 A1 | 4/2006 | Klein |
| 2006/0106289 A1 | 5/2006 | Elser |
| 2006/0117619 A1 | 6/2006 | Costantini |
| 2006/0155172 A1 | 7/2006 | Rugg |
| 2006/0170561 A1 | 8/2006 | Eyal |
| 2006/0173367 A1 | 8/2006 | Stuart et al. |
| 2006/0185605 A1 | 8/2006 | Renz et al. |
| 2006/0201432 A1 | 9/2006 | Pratt |
| 2006/0201436 A1 | 9/2006 | Kates |
| 2006/0207515 A1 | 9/2006 | Palett et al. |
| 2006/0208885 A1 | 9/2006 | Lin |
| 2006/0208887 A1 | 9/2006 | Fields et al. |
| 2006/0241521 A1 | 10/2006 | Cohen |
| 2006/0254523 A1 | 11/2006 | Guo |
| 2006/0282274 A1 | 12/2006 | Bennett |
| 2006/0290514 A1 | 12/2006 | Sakama et al. |
| 2007/0006494 A1 | 1/2007 | Hayes et al. |
| 2007/0008155 A1 | 1/2007 | Trost et al. |
| 2007/0021660 A1 | 1/2007 | Delonzor et al. |
| 2007/0027375 A1 | 2/2007 | Melker et al. |
| 2007/0027377 A1 | 2/2007 | Delonzor et al. |
| 2007/0027379 A1 | 2/2007 | Delonzor et al. |
| 2007/0029381 A1 | 2/2007 | Braiman |
| 2007/0044317 A1 | 3/2007 | Critelli |
| 2007/0044732 A1 | 3/2007 | Araki et al. |
| 2007/0062457 A1 | 3/2007 | Bates et al. |
| 2007/0069899 A1 | 3/2007 | Shih et al. |
| 2007/0103296 A1 | 5/2007 | Paessel et al. |
| 2007/0149871 A1 | 6/2007 | Sarussi et al. |
| 2007/0152825 A1 | 7/2007 | August et al. |
| 2007/0193521 A1 | 8/2007 | Alveby |
| 2007/0222624 A1 | 9/2007 | Eicken et al. |
| 2007/0255124 A1 | 11/2007 | Pologe et al. |
| 2007/0258625 A1 | 11/2007 | Mirtsching |
| 2007/0283791 A1 | 12/2007 | Engvall et al. |
| 2007/0298421 A1 | 12/2007 | Jiang et al. |
| 2008/0001815 A1 | 1/2008 | Wang et al. |
| 2008/0004798 A1 | 1/2008 | Troxler et al. |
| 2008/0017126 A1 | 1/2008 | Adams et al. |
| 2008/0018481 A1 | 1/2008 | Zehavi |
| 2008/0021352 A1 | 1/2008 | Keegan et al. |
| 2008/0036610 A1 | 2/2008 | Hokuf et al. |
| 2008/0047177 A1 | 2/2008 | Hilpert |
| 2008/0055155 A1 | 3/2008 | Hensley et al. |
| 2008/0059263 A1 | 3/2008 | Stroman et al. |
| 2008/0061990 A1 | 3/2008 | Milnes et al. |
| 2008/0076988 A1 | 3/2008 | Sarussi et al. |
| 2008/0076992 A1 | 3/2008 | Hete et al. |
| 2008/0085522 A1 | 4/2008 | Meghen et al. |
| 2008/0097726 A1 | 4/2008 | Lorton et al. |
| 2008/0110406 A1 | 5/2008 | Anderson et al. |
| 2008/0146890 A1 | 6/2008 | LeBoeuf et al. |
| 2008/0173255 A1 | 7/2008 | Mainini et al. |
| 2008/0190202 A1 | 8/2008 | Kulach et al. |
| 2008/0190379 A1 | 8/2008 | Mainini et al. |
| 2008/0215484 A1 | 9/2008 | Oldham |
| 2008/0227662 A1 | 9/2008 | Stromberg et al. |
| 2008/0228105 A1 | 9/2008 | Howell et al. |
| 2008/0262326 A1 | 10/2008 | Hete et al. |
| 2008/0272908 A1 | 11/2008 | Boyd |
| 2008/0312511 A1 | 12/2008 | Osler et al. |
| 2008/0314325 A1 | 12/2008 | Hempstead |
| 2009/0009388 A1 | 1/2009 | Wangrud |
| 2009/0020613 A1 | 1/2009 | Chang et al. |
| 2009/0025651 A1 | 1/2009 | Lalor |
| 2009/0027165 A1 | 1/2009 | Cristache |
| 2009/0058730 A1 | 3/2009 | Geissler et al. |
| 2009/0094869 A1 | 4/2009 | Geissler et al. |
| 2009/0102668 A1 | 4/2009 | Thompson et al. |
| 2009/0139462 A1 | 6/2009 | So |
| 2009/0149727 A1 | 6/2009 | Truitt et al. |
| 2009/0187392 A1 | 7/2009 | Riskey et al. |
| 2009/0212915 A1 | 8/2009 | Ulrich |
| 2009/0255484 A1 | 10/2009 | Muelken |
| 2009/0312667 A1 | 12/2009 | Utsunomiya et al. |
| 2010/0018363 A1 | 1/2010 | Chervenak et al. |
| 2010/0027845 A1 | 2/2010 | Kim |
| 2010/0030036 A1 | 2/2010 | Mottram et al. |
| 2010/0045468 A1 | 2/2010 | Geissler |
| 2010/0107985 A1 | 5/2010 | O'Hare |
| 2010/0113902 A1 | 5/2010 | Hete et al. |
| 2010/0116211 A1 | 5/2010 | Sundborger |
| 2010/0139575 A1 | 6/2010 | Duncan et al. |
| 2010/0147221 A1 | 6/2010 | Holscher |
| 2010/0154722 A1 | 6/2010 | Van Den Berg |
| 2010/0160809 A1 | 6/2010 | Laurence et al. |
| 2010/0175625 A1 | 7/2010 | Klenotiz et al. |
| 2010/0217102 A1 | 8/2010 | LeBoeuf et al. |
| 2010/0250198 A1 | 9/2010 | Lorton et al. |
| 2010/0288198 A1 | 11/2010 | Liao et al. |
| 2010/0289639 A1 | 11/2010 | Gibson et al. |
| 2010/0315241 A1 | 12/2010 | Jow |
| 2010/0321182 A1 | 12/2010 | Wangrud |
| 2010/0321189 A1 | 12/2010 | Gibson et al. |
| 2010/0331739 A1 | 12/2010 | Maltz et al. |
| 2011/0018717 A1 | 1/2011 | Takahashi et al. |
| 2011/0061605 A1 | 3/2011 | Hardi et al. |
| 2011/0095089 A1 | 4/2011 | Kolton et al. |
| 2011/0121356 A1 | 5/2011 | Krawinkel et al. |
| 2011/0137185 A1 | 6/2011 | Hete et al. |
| 2011/0152876 A1 | 6/2011 | Vandeputte |
| 2011/0166793 A1 | 7/2011 | March et al. |
| 2011/0178423 A1 | 7/2011 | Hatch |
| 2011/0203144 A1 | 8/2011 | Junek et al. |
| 2011/0258130 A1 | 10/2011 | Grabiner et al. |
| 2011/0272470 A1 | 11/2011 | Baba et al. |
| 2011/0313264 A1 | 12/2011 | Hete et al. |
| 2012/0009943 A1 | 1/2012 | Greenberg et al. |
| 2012/0024238 A1 | 2/2012 | Corke |
| 2012/0068848 A1 | 3/2012 | Campbell et al. |
| 2012/0089152 A1 | 4/2012 | Lynd et al. |
| 2012/0092132 A1 | 4/2012 | Holme et al. |
| 2012/0111286 A1 | 5/2012 | Lee et al. |
| 2012/0112917 A1 | 5/2012 | Menachem et al. |
| 2012/0154147 A1 | 6/2012 | Cao et al. |
| 2012/0160181 A1 | 6/2012 | So et al. |
| 2012/0175412 A1 | 7/2012 | Grabiner et al. |
| 2012/0204811 A1 | 8/2012 | Ryan |
| 2012/0234245 A1 | 9/2012 | Rajkondawar et al. |
| 2012/0236690 A1 | 9/2012 | Rader et al. |
| 2012/0238912 A1 | 9/2012 | Rajkondawar et al. |
| 2012/0291715 A1 | 11/2012 | Jiang et al. |
| 2012/0299731 A1 | 11/2012 | Triener |
| 2012/0312250 A1 | 12/2012 | Jesurum |
| 2012/0326862 A1 | 12/2012 | Kwak et al. |

(56) References Cited

U.S. PATENT DOCUMENTS

| | | |
|---|---|---|
| 2012/0326874 A1 | 12/2012 | Kwak et al. |
| 2013/0006065 A1 | 1/2013 | Yanai et al. |
| 2013/0008391 A1 | 1/2013 | Berntsen |
| 2013/0014706 A1 | 1/2013 | Menkes |
| 2013/0046170 A1 | 2/2013 | Haynes |
| 2013/0092099 A1 | 4/2013 | Hardi et al. |
| 2013/0098295 A1 | 4/2013 | Mulder |
| 2013/0113622 A1 | 5/2013 | Pratt et al. |
| 2013/0119142 A1 | 5/2013 | Mccoy et al. |
| 2013/0175347 A1 | 7/2013 | Decaluwe et al. |
| 2013/0192526 A1 | 8/2013 | Mainini |
| 2013/0211773 A1 | 8/2013 | Loeschinger et al. |
| 2013/0222141 A1 | 8/2013 | Rhee et al. |
| 2013/0237778 A1 | 9/2013 | Rouquette et al. |
| 2013/0239904 A1 | 9/2013 | Kim et al. |
| 2013/0239907 A1 | 9/2013 | Laurence et al. |
| 2013/0265165 A1 | 10/2013 | So et al. |
| 2013/0285815 A1 | 10/2013 | Jones, II |
| 2014/0073486 A1 | 3/2014 | Ahmed et al. |
| 2014/0122488 A1 | 5/2014 | Jung et al. |
| 2014/0123912 A1 | 5/2014 | Menkes et al. |
| 2014/0135596 A1 | 5/2014 | LeBoeuf et al. |
| 2014/0135631 A1 | 5/2014 | Brumback et al. |
| 2014/0171762 A1 | 6/2014 | LeBoeuf et al. |
| 2014/0174376 A1 | 6/2014 | Touchton et al. |
| 2014/0196673 A1 | 7/2014 | Menkes et al. |
| 2014/0230755 A1 | 8/2014 | Trenkle et al. |
| 2014/0232541 A1 | 8/2014 | Trenkle et al. |
| 2014/0253709 A1 | 9/2014 | Bresch et al. |
| 2014/0261235 A1 | 9/2014 | Rich et al. |
| 2014/0267299 A1 | 9/2014 | Couse |
| 2014/0275824 A1 | 9/2014 | Couse |
| 2014/0276089 A1 | 9/2014 | Kirenko et al. |
| 2014/0290013 A1 | 10/2014 | Eidelman et al. |
| 2014/0302783 A1 | 10/2014 | Aiuto et al. |
| 2014/0331942 A1 | 11/2014 | Sarazyn |
| 2014/0333439 A1 | 11/2014 | Downing et al. |
| 2014/0347184 A1 | 11/2014 | Triener |
| 2014/0352632 A1 | 12/2014 | Mclaughlin |
| 2014/0361077 A1 | 12/2014 | Davidson |
| 2014/0368338 A1 | 12/2014 | Rettedal et al. |
| 2015/0025394 A1 | 1/2015 | Hong et al. |
| 2015/0039239 A1 | 2/2015 | Shuler et al. |
| 2015/0057963 A1 | 2/2015 | Zakharov et al. |
| 2015/0097668 A1 | 4/2015 | Toth et al. |
| 2015/0099472 A1 | 4/2015 | Ickovic |
| 2015/0100245 A1 | 4/2015 | Huang et al. |
| 2015/0107519 A1 | 4/2015 | Rajkondawar et al. |
| 2015/0107522 A1 | 4/2015 | Lamb |
| 2015/0109130 A1 | 4/2015 | Rajkondawar et al. |
| 2015/0122893 A1 | 5/2015 | Warther |
| 2015/0128873 A1 | 5/2015 | Prescott et al. |
| 2015/0130617 A1 | 5/2015 | Triener |
| 2015/0148811 A1 | 5/2015 | Swope et al. |
| 2015/0157435 A1 | 6/2015 | Chasins et al. |
| 2015/0182322 A1 | 7/2015 | Couse et al. |
| 2015/0245592 A1 | 9/2015 | Sibbald et al. |
| 2015/0282457 A1 | 10/2015 | Yarden et al. |
| 2015/0334994 A1 | 11/2015 | Prasad |
| 2015/0342143 A1 | 12/2015 | Stewart |
| 2015/0351885 A1 | 12/2015 | Kool |
| 2015/0366166 A1 | 12/2015 | Mueller et al. |
| 2016/0000045 A1 | 1/2016 | Funaya et al. |
| 2016/0021506 A1 | 1/2016 | Bonge, Jr. |
| 2016/0058379 A1 | 3/2016 | Menkes et al. |
| 2016/0066546 A1 | 3/2016 | Borchersen et al. |
| 2016/0100802 A1 | 4/2016 | Newman |
| 2016/0106064 A1 | 4/2016 | Bladen et al. |
| 2016/0113524 A1 | 4/2016 | Gross et al. |
| 2016/0120154 A1 | 5/2016 | Hill et al. |
| 2016/0128637 A1 | 5/2016 | LeBoeuf et al. |
| 2016/0135431 A1 | 5/2016 | Siegel |
| 2016/0148086 A1 | 5/2016 | Clarke et al. |
| 2016/0150362 A1 | 5/2016 | Shaprio et al. |
| 2016/0151013 A1 | 6/2016 | Atallah et al. |
| 2016/0165851 A1 | 6/2016 | Harty et al. |
| 2016/0165852 A1 | 6/2016 | Goldfain |
| 2016/0166761 A1 | 6/2016 | Piehl et al. |
| 2016/0198957 A1 | 7/2016 | Arditi et al. |
| 2016/0210841 A1 | 7/2016 | Huang et al. |
| 2016/0213317 A1 | 7/2016 | Richardson et al. |
| 2016/0278712 A1 | 9/2016 | Sagara et al. |
| 2016/0286757 A1 | 10/2016 | Armstrong |
| 2016/0287108 A1 | 10/2016 | Wei et al. |
| 2016/0317049 A1 | 11/2016 | LeBoeuf et al. |
| 2016/0345881 A1 | 12/2016 | Sarantos et al. |
| 2016/0360733 A1 | 12/2016 | Triener |
| 2016/0367495 A1 | 12/2016 | Miller et al. |
| 2017/0000090 A1 | 1/2017 | Hall |
| 2017/0006836 A1 | 1/2017 | Torres |
| 2017/0006838 A1 | 1/2017 | Brayer |
| 2017/0042119 A1 | 2/2017 | Garrity |
| 2017/0067770 A1 | 3/2017 | Sun |
| 2017/0079247 A1 | 3/2017 | Womble et al. |
| 2017/0095206 A1 | 4/2017 | Leib et al. |
| 2017/0156288 A1 | 6/2017 | Singh |
| 2017/0164905 A1 | 6/2017 | Gumiero et al. |
| 2017/0193208 A1 | 7/2017 | Ashley et al. |
| 2017/0196203 A1 | 7/2017 | Huisma et al. |
| 2017/0202185 A1 | 7/2017 | Trumbull et al. |
| 2017/0245797 A1 | 8/2017 | Quinn |
| 2017/0258039 A1 | 9/2017 | Lauterbach |
| 2017/0272842 A1 | 9/2017 | Touma |
| 2017/0280675 A1 | 10/2017 | MacNeil et al. |
| 2017/0280688 A1 | 10/2017 | Deliou et al. |
| 2017/0318781 A1 | 11/2017 | Rollins et al. |
| 2017/0360004 A1 | 12/2017 | Carver |
| 2017/0367305 A1 | 12/2017 | Castro Lisboa et al. |
| 2017/0372583 A1 | 12/2017 | Lamkin et al. |
| 2018/0000045 A1 | 1/2018 | Bianchi et al. |
| 2018/0007863 A1 | 1/2018 | Bailey et al. |
| 2018/0014512 A1 | 1/2018 | Arabani et al. |
| 2018/0027772 A1 | 2/2018 | Gordon et al. |
| 2018/0035648 A1 | 2/2018 | Ikeda |
| 2018/0055016 A1 | 3/2018 | Hsieh et al. |
| 2018/0064068 A1 | 3/2018 | McKee et al. |
| 2018/0070559 A1 | 3/2018 | So |
| 2018/0098522 A1 | 4/2018 | Steinfort |
| 2018/0110205 A1 | 4/2018 | Czarnecky et al. |
| 2018/0113498 A1 | 4/2018 | Cronin et al. |
| 2018/0131074 A1 | 5/2018 | Wilkinson et al. |
| 2018/0132455 A1 | 5/2018 | Pradeep et al. |
| 2018/0146645 A1 | 5/2018 | Arbel |
| 2018/0160649 A1 | 6/2018 | Hicks et al. |
| 2018/0206455 A1 | 7/2018 | Thiex et al. |
| 2018/0242860 A1 | 8/2018 | LeBoeuf et al. |
| 2018/0249683 A1 | 9/2018 | Borchersen et al. |
| 2018/0260976 A1 | 9/2018 | Watanabe et al. |
| 2018/0271058 A1 | 9/2018 | Valdez |
| 2018/0279582 A1 | 10/2018 | Yajima et al. |
| 2018/0288968 A1 | 10/2018 | Cisco et al. |
| 2018/0295809 A1 | 10/2018 | Yajima et al. |
| 2018/0303425 A1 | 10/2018 | Wordham et al. |
| 2018/0310526 A1 | 11/2018 | Birch et al. |
| 2018/0325382 A1 | 11/2018 | Brandao et al. |
| 2018/0332989 A1 | 11/2018 | Chiu et al. |
| 2018/0333244 A1 | 11/2018 | Hanks et al. |
| 2019/0008118 A1 | 1/2019 | Keegan |
| 2019/0008124 A1 | 1/2019 | Komatsu et al. |
| 2019/0029226 A1 | 1/2019 | Triener |
| 2019/0053469 A1 | 2/2019 | Mardirossian |
| 2019/0053470 A1 | 2/2019 | Singh et al. |
| 2019/0059335 A1 | 2/2019 | Crider, Jr. et al. |
| 2019/0059337 A1 | 2/2019 | Robbins |
| 2019/0059741 A1 | 2/2019 | Crider, Jr. et al. |
| 2019/0069512 A1 | 3/2019 | Eriksson et al. |
| 2019/0075945 A1 | 3/2019 | Strassburger et al. |
| 2019/0082654 A1 | 3/2019 | Robbins |
| 2019/0090754 A1 | 3/2019 | Brandao et al. |
| 2019/0110433 A1 | 4/2019 | Myers |
| 2019/0110436 A1 | 4/2019 | Gardner et al. |
| 2019/0125509 A1 | 5/2019 | Hotchkin |
| 2019/0130728 A1 | 5/2019 | Struhsaker et al. |
| 2019/0133086 A1 | 5/2019 | Katz et al. |

(56) References Cited

U.S. PATENT DOCUMENTS

| | | |
|---|---|---|
| 2019/0141914 A1 | 5/2019 | Nelson et al. |
| 2019/0159428 A1 | 5/2019 | Bolen |
| 2019/0166802 A1 | 6/2019 | Seltzer et al. |
| 2019/0183091 A1 | 6/2019 | Betts-LaCroix et al. |
| 2019/0183092 A1 | 6/2019 | Couse et al. |
| 2019/0208358 A1 | 7/2019 | de Barros Chapiewski et al. |
| 2019/0213860 A1 | 7/2019 | Shaprio et al. |
| 2019/0254599 A1 | 8/2019 | Young et al. |
| 2019/0287429 A1 | 9/2019 | Dawson et al. |
| 2019/0290133 A1 | 9/2019 | Crider et al. |
| 2019/0290847 A1 | 9/2019 | Veyrent et al. |
| 2019/0298226 A1 | 10/2019 | Filipowicz et al. |
| 2019/0298924 A1 | 10/2019 | Gibson et al. |
| 2019/0327939 A1 | 10/2019 | Sharpe et al. |
| 2019/0335715 A1 | 11/2019 | Hicks et al. |
| 2019/0350168 A1 | 11/2019 | Shi |
| 2019/0365324 A1 | 12/2019 | Chang |
| 2019/0373857 A1 | 12/2019 | Leigh-Lancaster et al. |
| 2019/0380311 A1 | 12/2019 | Crouthamel et al. |
| 2019/0385037 A1 | 12/2019 | Robadey et al. |
| 2019/0385332 A1 | 12/2019 | Yajima et al. |
| 2020/0015740 A1 | 1/2020 | Alnofeli et al. |
| 2020/0029534 A1 | 1/2020 | Austin et al. |
| 2020/0037886 A1 | 2/2020 | Greer et al. |
| 2020/0068853 A1 | 3/2020 | Radovcic |
| 2020/0085019 A1 | 3/2020 | Gilbert et al. |
| 2020/0100463 A1 | 4/2020 | Rooda et al. |
| 2020/0107522 A1 | 4/2020 | Kersey et al. |
| 2020/0110946 A1 | 4/2020 | Kline et al. |
| 2020/0113728 A1 | 4/2020 | Spector et al. |
| 2020/0125849 A1 | 4/2020 | Labrecque et al. |
| 2020/0170222 A1 | 6/2020 | Gotts |
| 2020/0178505 A1 | 6/2020 | Womble et al. |
| 2020/0178800 A1 | 6/2020 | Geissler et al. |
| 2020/0205381 A1 | 7/2020 | Wernimont et al. |
| 2020/0214266 A1 | 7/2020 | Fujiyama |
| 2020/0229391 A1 | 7/2020 | De Groot et al. |
| 2020/0229707 A1 | 7/2020 | Donnelly |
| 2020/0242551 A1 | 7/2020 | Lau et al. |
| 2021/0004536 A1 | 1/2021 | Adibi et al. |
| 2021/0045360 A1 | 2/2021 | Harvey et al. |
| 2022/0020051 A1 | 1/2022 | Aruga et al. |

FOREIGN PATENT DOCUMENTS

| | | |
|---|---|---|
| AU | 2003239832 | 5/2002 |
| AU | 2003238759 | 1/2004 |
| AU | 2004263067 | 2/2005 |
| AU | 2004305403 | 7/2005 |
| AU | 2011210083 | 8/2011 |
| AU | 2016266101 | 12/2016 |
| AU | 2017100469 | 5/2017 |
| AU | 2018220079 | 9/2018 |
| AU | 2020202232 | 10/2020 |
| AU | 2019261293 A1 | 12/2020 |
| BR | 8701673 | 3/2009 |
| BR | 112012018909 B1 | 6/2019 |
| CA | 2267812 | 10/2000 |
| CA | 2493331 | 1/2005 |
| CA | 2788153 | 8/2011 |
| CA | 2880138 | 2/2013 |
| CA | 2858905 | 10/2013 |
| CA | 2875637 | 1/2014 |
| CA | 2875578 | 12/2014 |
| CA | 2915843 | 12/2014 |
| CA | 2990620 | 12/2016 |
| CA | 2916286 | 6/2017 |
| CA | 3007296 | 6/2017 |
| CA | 3052216 A1 | 8/2018 |
| CN | 1989895 | 7/2007 |
| CN | 201171316 | 12/2008 |
| CN | 101578516 | 11/2009 |
| CN | 101816290 | 9/2010 |
| CN | 101875975 | 11/2010 |
| CN | 101875976 | 11/2010 |
| CN | 102781225 | 1/2011 |
| CN | 102142116 | 8/2011 |
| CN | 102485892 | 6/2012 |
| CN | 102682322 | 9/2012 |
| CN | 203313865 | 12/2013 |
| CN | 203689049 | 2/2014 |
| CN | 203523519 | 4/2014 |
| CN | 204047531 | 8/2014 |
| CN | 204331349 | 5/2015 |
| CN | 204305813 | 6/2015 |
| CN | 105191817 | 12/2015 |
| CN | 106125648 | 11/2016 |
| CN | 106172068 | 12/2016 |
| CN | 106197675 | 12/2016 |
| CN | 106719037 | 2/2017 |
| CN | 205919898 | 2/2017 |
| CN | 106472347 | 3/2017 |
| CN | 106845598 | 6/2017 |
| CN | 206431665 | 8/2017 |
| CN | 107201409 | 9/2017 |
| CN | 207201674 | 9/2017 |
| CN | 107251851 | 10/2017 |
| CN | 107667898 | 2/2018 |
| CN | 108353810 | 2/2018 |
| CN | 207100094 | 3/2018 |
| CN | 207249710 | 4/2018 |
| CN | 108651301 | 5/2018 |
| CN | 108656996 | 5/2018 |
| CN | 108684549 | 5/2018 |
| CN | 108118096 | 6/2018 |
| CN | 108308055 | 7/2018 |
| CN | 109006541 | 8/2018 |
| CN | 109008529 | 8/2018 |
| CN | 108617533 | 10/2018 |
| CN | 108717668 | 10/2018 |
| CN | 108766586 | 11/2018 |
| CN | 109006550 | 12/2018 |
| CN | 208273869 | 12/2018 |
| CN | 109355402 | 2/2019 |
| CN | 109937904 | 3/2019 |
| CN | 109937905 | 3/2019 |
| CN | 109823691 | 5/2019 |
| CN | 110073995 | 5/2019 |
| CN | 110059781 | 7/2019 |
| CN | 110106261 | 8/2019 |
| CN | 110106262 | 8/2019 |
| CN | 110506656 | 11/2019 |
| CN | 210076292 | 2/2020 |
| DE | 633742 | 8/1936 |
| DE | 2850438 | 5/1980 |
| DE | 19629166 | 2/1997 |
| DE | 19826348 | 6/1998 |
| DE | 29906146 | 6/1999 |
| DE | 19911766 | 9/2000 |
| DE | 20018364 | 1/2001 |
| DE | 10001176 | 5/2001 |
| DE | 102004027978.00 | 12/2005 |
| DE | 202010008325 | 2/2012 |
| DE | 202013011075.00 | 1/2014 |
| DE | 202016101289 | 4/2016 |
| DK | 140001 | 11/1979 |
| EP | 55127 | 6/1982 |
| EP | 125915 | 11/1984 |
| EP | 499428 | 8/1992 |
| EP | 513525 | 11/1992 |
| EP | 743043 | 11/1996 |
| EP | 938841 | 2/1998 |
| EP | 898449 | 3/1999 |
| EP | 1076485 | 2/2001 |
| EP | 1445723 | 8/2004 |
| EP | 1479338 | 11/2004 |
| EP | 1521208 | 4/2005 |
| EP | 1907816 | 4/2008 |
| EP | 1961294 | 8/2008 |
| EP | 2028931 | 3/2009 |
| EP | 2172878 | 4/2010 |
| EP | 2528431 | 1/2011 |
| EP | 2453733 | 5/2012 |
| EP | 2465344 | 6/2012 |

(56) References Cited

FOREIGN PATENT DOCUMENTS

| | | |
|----|----|----|
| EP | 2488237 | 8/2012 |
| EP | 2534945 | 12/2012 |
| EP | 2657889 | 10/2013 |
| EP | 2664234 | 11/2013 |
| EP | 2728995 | 5/2014 |
| EP | 2879615 | 6/2015 |
| EP | 2955998 | 12/2015 |
| EP | 3153098 | 4/2017 |
| EP | 3164855 | 5/2017 |
| EP | 3210531 | 8/2017 |
| EP | 3217566 | 9/2017 |
| EP | 3218865 | 9/2017 |
| EP | 3225106 | 10/2017 |
| EP | 3231281 A1 | 10/2017 |
| EP | 3316680 | 5/2018 |
| EP | 3346422 | 7/2018 |
| EP | 3385886 | 10/2018 |
| EP | 3593634 | 1/2020 |
| EP | 3627856 | 3/2020 |
| EP | 3660855 | 6/2020 |
| ES | 2046912 | 2/1994 |
| ES | 2206009 | 5/2004 |
| ES | 2215152 | 10/2004 |
| ES | 1072416 | 7/2010 |
| ES | 2391341 | 11/2012 |
| ES | 1194609 | 10/2017 |
| FI | 20165318 | 6/2017 |
| FR | 2106705 | 5/1972 |
| FR | 2297565 | 8/1976 |
| FR | 2342024 | 1/1983 |
| FR | 2601848 | 1/1988 |
| FR | 2779153 | 12/1999 |
| FR | 2834521 | 7/2003 |
| FR | 2964777 | 3/2012 |
| FR | 3046332 | 1/2016 |
| FR | 3024653 | 2/2016 |
| FR | 3085249 | 9/2018 |
| GB | 588870 | 6/1947 |
| GB | 641394 | 8/1950 |
| GB | 865164 | 4/1961 |
| GB | 1072971 | 6/1967 |
| GB | 1267830 | 3/1972 |
| GB | 1415650 | 11/1975 |
| GB | 2067121 | 7/1981 |
| GB | 2055670 | 7/1983 |
| GB | 2114045 | 8/1983 |
| GB | 2125343 | 3/1984 |
| GB | 2142812 | 1/1985 |
| GB | 2392138 | 2/2004 |
| GB | 2469326 | 10/2010 |
| GB | 2554636 | 4/2018 |
| GB | 2570340 | 7/2019 |
| GB | 2571404 | 8/2019 |
| IN | 201103443 | 12/2011 |
| IN | 200802272 | 6/2016 |
| JP | 57173562 | 11/1982 |
| JP | 7177832 | 7/1995 |
| JP | 2001178692 | 7/2001 |
| JP | 2004292151 | 10/2004 |
| JP | 2005102959 | 4/2005 |
| JP | 2008157902 A | 7/2008 |
| JP | 5659243 | 1/2011 |
| JP | 2011067178 | 4/2011 |
| JP | 2011087657 | 5/2011 |
| JP | 2013247941 | 6/2012 |
| JP | 2017112857 | 6/2017 |
| JP | 2017002170 | 4/2018 |
| KR | 2003061157 | 7/2003 |
| KR | 2005046330 | 5/2005 |
| KR | 780449 | 11/2007 |
| KR | 20130019970 | 2/2013 |
| KR | 20130057683 | 6/2013 |
| KR | 2013138899 | 12/2013 |
| KR | 2019061805 | 11/2017 |
| KR | 101827311 | 2/2018 |
| KR | 20180035537 | 4/2018 |
| KR | 2018109451 | 10/2018 |
| KR | 20190081598 | 7/2019 |
| KR | 2019091708 | 8/2019 |
| KR | 20200042379 A | 4/2020 |
| MX | 9600754 | 2/1997 |
| MX | 356331 | 1/2011 |
| NL | 2017104 | 1/2018 |
| NL | 2019186 | 1/2019 |
| NL | 2020275 | 7/2019 |
| NZ | 198486 | 5/1986 |
| NZ | 199494 | 7/1986 |
| NZ | 203924 | 10/1986 |
| NZ | 335702 | 3/2001 |
| NZ | 507129 | 8/2002 |
| NZ | 582984 | 1/2011 |
| NZ | 101747418 | 1/2011 |
| NZ | 751839 A | 8/2021 |
| RU | 2178711 | 1/2002 |
| RU | 2265324 | 12/2005 |
| SE | 4567 | 3/1893 |
| SE | 5549 | 4/1894 |
| SE | 123213 | 11/1948 |
| SE | 188102 | 3/1964 |
| SU | 1766336 | 10/1992 |
| WO | 1984000468 | 2/1984 |
| WO | 1991011956 | 8/1991 |
| WO | 199302549 | 2/1993 |
| WO | 9739618 | 4/1997 |
| WO | 199822028 | 5/1998 |
| WO | 1998039475 | 9/1998 |
| WO | 1999017658 | 4/1999 |
| WO | 2000062263 | 4/1999 |
| WO | 1999045761 | 9/1999 |
| WO | 2000013393 | 3/2000 |
| WO | 2000061802 | 10/2000 |
| WO | 2001004858 A1 | 1/2001 |
| WO | 2001033950 | 5/2001 |
| WO | 2001087054 | 11/2001 |
| WO | 0193667 A1 | 12/2001 |
| WO | 2002031629 | 4/2002 |
| WO | 2002085106 | 10/2002 |
| WO | 2003001180 | 1/2003 |
| WO | 2004092920 | 3/2003 |
| WO | 2003087765 | 10/2003 |
| WO | 2003094605 | 11/2003 |
| WO | 2004015655 | 2/2004 |
| WO | 2005104775 | 4/2004 |
| WO | 2006078943 | 1/2005 |
| WO | 2005104930 | 4/2005 |
| WO | 2005073408 | 8/2005 |
| WO | 2006021855 | 3/2006 |
| WO | 2006022548 A1 | 3/2006 |
| WO | 2006134197 | 12/2006 |
| WO | 2006135265 | 12/2006 |
| WO | 2007013820 | 2/2007 |
| WO | 2007034211 | 3/2007 |
| WO | 2007095684 | 8/2007 |
| WO | 2007122375 | 11/2007 |
| WO | 2008033042 | 3/2008 |
| WO | 2008041839 A1 | 4/2008 |
| WO | 2008052298 | 5/2008 |
| WO | 2008075974 | 6/2008 |
| WO | 2008084905 A1 | 7/2008 |
| WO | 2010091686 | 12/2008 |
| WO | 2009034497 | 3/2009 |
| WO | 2009062249 | 5/2009 |
| WO | 2009076325 | 6/2009 |
| WO | 2009089215 | 7/2009 |
| WO | 2009117764 | 10/2009 |
| WO | 2009153779 | 12/2009 |
| WO | 2010008620 | 1/2010 |
| WO | 2010048753 | 5/2010 |
| WO | 2010053811 | 5/2010 |
| WO | 2010068713 | 6/2010 |
| WO | 2010140900 | 12/2010 |
| WO | 2012075480 | 12/2010 |
| WO | 2011039112 | 4/2011 |
| WO | 2011093726 | 4/2011 |

(56)     References Cited

FOREIGN PATENT DOCUMENTS

| WO | 2011076886 |  | 6/2011 |
| WO | 2011154949 |  | 12/2011 |
| WO | 2012071670 |  | 6/2012 |
| WO | 2013008115 |  | 1/2013 |
| WO | 2013038326 |  | 3/2013 |
| WO | 2013082227 |  | 6/2013 |
| WO | 2015001537 |  | 7/2013 |
| WO | 2013118121 |  | 8/2013 |
| WO | 2015024050 |  | 8/2013 |
| WO | 2013179020 |  | 12/2013 |
| WO | 2013190423 |  | 12/2013 |
| WO | 2014019791 |  | 2/2014 |
| WO | 2014020463 |  | 2/2014 |
| WO | 2014030156 | A1 | 2/2014 |
| WO | 2014055005 | A1 | 4/2014 |
| WO | 2014095759 |  | 6/2014 |
| WO | 2014107766 |  | 7/2014 |
| WO | 2014118788 |  | 8/2014 |
| WO | 2014125250 |  | 8/2014 |
| WO | 2014126459 |  | 8/2014 |
| WO | 2016027271 |  | 8/2014 |
| WO | 2014140148 |  | 9/2014 |
| WO | 2014141084 |  | 9/2014 |
| WO | 2014194383 |  | 12/2014 |
| WO | 2014197631 |  | 12/2014 |
| WO | 2014199363 |  | 12/2014 |
| WO | 2015009167 |  | 1/2015 |
| WO | 2015030832 |  | 3/2015 |
| WO | 2015055709 |  | 4/2015 |
| WO | 2015086338 |  | 6/2015 |
| WO | 2016207844 |  | 6/2015 |
| WO | 2015107354 |  | 7/2015 |
| WO | 2017001717 |  | 7/2015 |
| WO | 2017031532 |  | 8/2015 |
| WO | 2015140486 |  | 9/2015 |
| WO | 2015158787 |  | 10/2015 |
| WO | 2015160263 | A1 | 10/2015 |
| WO | 2015175686 |  | 11/2015 |
| WO | 2015176027 |  | 11/2015 |
| WO | 2015197385 |  | 12/2015 |
| WO | 2016005805 |  | 1/2016 |
| WO | 2016037190 |  | 3/2016 |
| WO | 2017149049 |  | 3/2016 |
| WO | 2016053104 |  | 4/2016 |
| WO | 2016077816 |  | 5/2016 |
| WO | 2016108187 |  | 7/2016 |
| WO | 2016166748 |  | 10/2016 |
| WO | 2017001538 |  | 1/2017 |
| WO | 2017027551 |  | 2/2017 |
| WO | 2017037479 |  | 3/2017 |
| WO | 2017066813 |  | 4/2017 |
| WO | 2017089289 |  | 6/2017 |
| WO | 2017096256 |  | 6/2017 |
| WO | 2017121834 |  | 7/2017 |
| WO | 2018006965 |  | 1/2018 |
| WO | 2018009063 | A1 | 1/2018 |
| WO | 2018011736 |  | 1/2018 |
| WO | 2018019742 |  | 2/2018 |
| WO | 2020022543 |  | 7/2018 |
| WO | 2018152593 | A1 | 8/2018 |
| WO | 2018172976 |  | 9/2018 |
| WO | 2020060248 |  | 9/2018 |
| WO | 2018203203 |  | 11/2018 |
| WO | 2019009717 |  | 1/2019 |
| WO | 2019025138 |  | 2/2019 |
| WO | 2019040721 | A2 | 2/2019 |
| WO | 2019046216 |  | 3/2019 |
| WO | 2019048521 | A1 | 3/2019 |
| WO | 2019058752 |  | 3/2019 |
| WO | 2019071222 |  | 4/2019 |
| WO | 2019132803 |  | 7/2019 |
| WO | 2019207561 |  | 10/2019 |
| WO | 2019235942 |  | 12/2019 |
| WO | 2019245978 |  | 12/2019 |
| WO | 2020003310 |  | 1/2020 |
| WO | 2020096528 |  | 5/2020 |
| WO | 2020140013 |  | 7/2020 |

OTHER PUBLICATIONS

Steensels, Machteld; Maltz, Ephraim; Bahr, Claudia; Berckmans, Daniel; Antler, Aharon; et Towards practical application of sensors for monitoring animal health: The effect of post-calving health problems on rumination duration, activity and milk yield, The Journal of Dairy Research; Cambridge vol. 84, Iss. 2, (May 2017): 132-138.

Clark, C., Lyons, N., Millapan, L., Talukder, S., Cronin, G., Kerrisk, K., & Garcia, S. (2015), Rumination and activity levels as predictors of calving for dairy cows, Animal, 9(4), 691-695.

K. Koyama, T. Koyama, M. Sugimoto, N. Kusakari, R. Miura, K. Yoshioka, M. Hirako, Prediction of calving time in Holstein dairy cows by monitoring the ventral tail base surface temperature, The Veterinary Journal, vol. 240, 2018, pp. 1-5, ISSN 1090-0233.

L. Calamari, N. Soriani, G. Panella, F. Petrera, A. Minuti, E. Trevisi, Rumination time around calving: An early signal to detect cows at greater risk of disease, Journal of Dairy Science, vol. 97, Issue 6, 2014, pp. 3635-3647, ISSN 0022-0302.

S. Benaissa, F.A.M. Tuyttens, D. Plets, J. Trogh, L. Martens, L. Vandaele, W. Joseph, Sonck, Calving and estrus detection in dairy cattle using a combination of indoor localization and accelerometer sensors, Computers and Electronics in Agriculture, vol. 168, 2020, 105153, ISSN 0168-1699.

Soriani, E. Trevisi, L. Calamari, Relationships between rumination time, metabolic conditions, and health in Journal of Animal Science, vol. 90, Issue 12, Dec. 2012, pp. 4544-4554.

The role of sensors, big data and machine learning in modern animal farming; Suresh Neethirajan; Received Jun. 2, 2020; Received in revised form Jun. 30, 2020; Accepted Jul. 3, 2020 Sensing and Bio-Sensing Research 29 (2020) 100367 2214-1804/ © 2020 the Author. Published by Elsevier B.V.

A Review on Determination of Computer Aid Diagnosis and/or Risk Factors Using Data Mining Methods in Veterinary Field Pınar Cihan, Erhan Gökçe, oya kalipsiz; Tekirda Namk Kemal University, Çorlu Faculty of Engineering, Department of Computer Engineering, Tekirda, Turkey. 2019.

Big Data Analytics and Precision Animal Agriculture Symposium: Data to decisions B. J. White, D. E. Amrine, and R. L. Larson Beef Cattle Institute, Kansas State University, Manhattan, KS; © the Author(s) 2018. Published by Oxford University Press on behalf of American Society of Animal Science.

Gasteiner, J.; Boswerger, B.; Guggenberger, T., Practical use of a novel ruminal sensor on dairy farms, Praktische Tierarzt 2012 vol. 93 No. 8 pp. 730-739 ref.45.

Drying up Cows and the Effect of Different Methods Upon Milk Production; Ralph Wayne, C. H. Eckles, and W. E. Peterson; Division of Dairy Husbandry, University of Minnesota, St. Paul; Research-Articlel vol. 16, Issue 1, p. 69-78, Jan. 1, 1933.

Dziuk P. Positive, accurate animal identification. Animal reproduction science. Dec. 15, 2003;79(3-4):319-23. The whole document.

Kumar S, Singh SK. Cattle recognition: A new frontier in visual animal biometrics research. Proceedings of the National Academy of Sciences, India Section A: Physical Sciences. Oct. 2020;90(4):689-708. The whole document.

Niloofar Parisa et al: "Data-driven decision support in livestock farming for improved animal health, welfare and greenhouse gas emissions: Overview and challenges", Computers and Electronics in Agriculture, Elsevier, Amsterdam, NL, vol. 190, Sep. 15, 2021 (Sep. 15, 2021), XP086847650, ISSN: 0168-1699, DOI: 10.1016/ J.COMPAG.2021.106406 [retrieved on Sep. 15, 2021] the whole document.

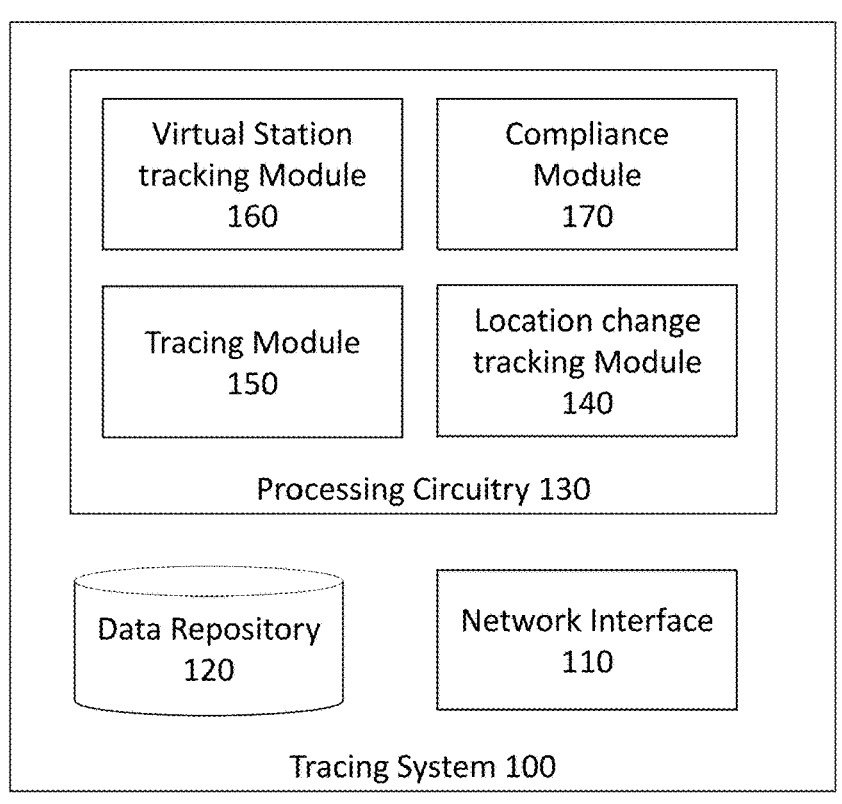

| Virtual Station tracking Module 160 | Compliance Module 170 |
| --- | --- |
| Tracing Module 150 | Location change tracking Module 140 |

Processing Circuitry 130

Data Repository 120

Network Interface 110

Tracing System 100

Fig. 2

200 obtain a reading of the given member's identification device attached to, and uniquely identifying, the given member, the reading acquired by the identification device reader located at the respective distinct physically separate location

210 insert a location change record to the data repository, indicating that the given member arrived at, or departed from, the distinct physically separate location, the location change record including an indication of an arrival time of the given member to the respective distinct physically separate location or the departure time of the given member from the respective distinct physically separate location, thereby enabling tracing the members throughout the process

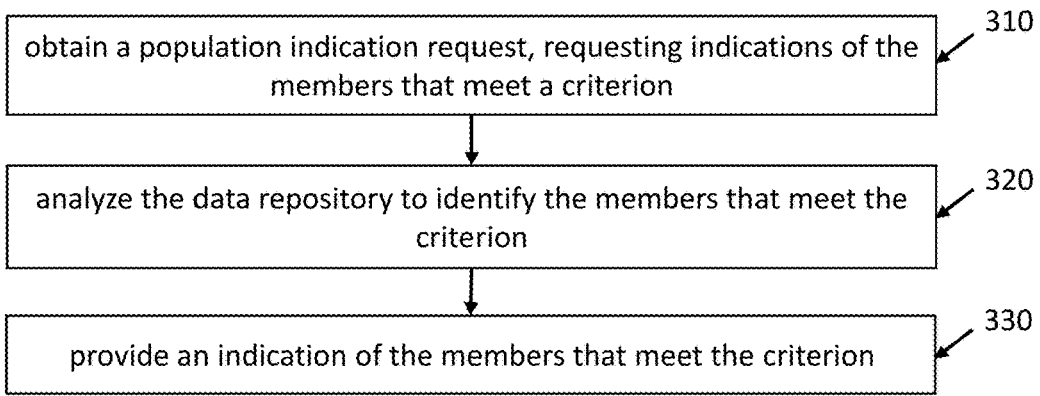

obtain a population indication request, requesting indications of the members that meet a criterion — 310 analyze the data repository to identify the members that meet the criterion — 320 provide an indication of the members that meet the criterion — 330

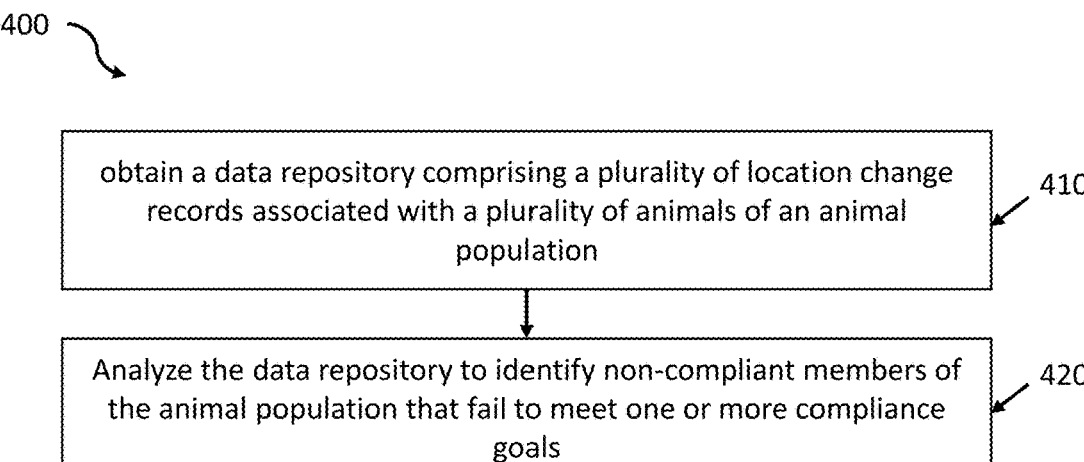

obtain a data repository comprising a plurality of location change records associated with a plurality of animals of an animal population — 410

Analyze the data repository to identify non-compliant members of the animal population that fail to meet one or more compliance goals — 420

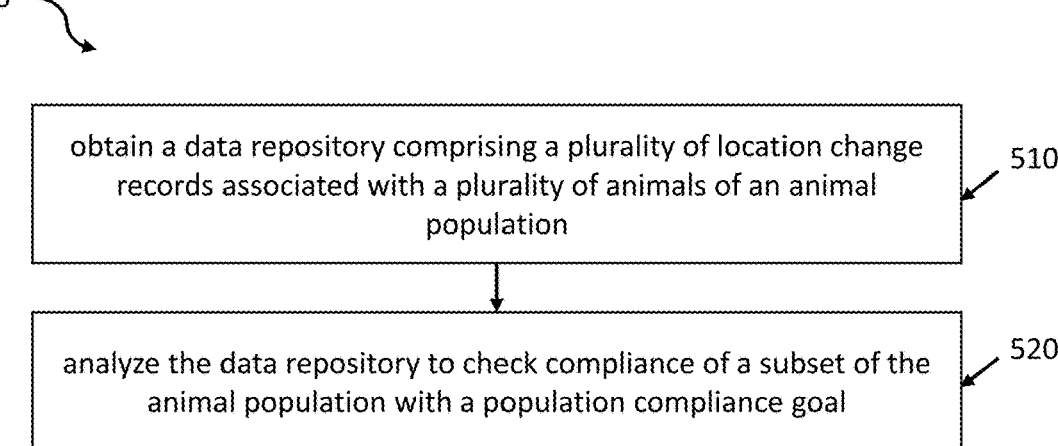

obtain a data repository comprising a plurality of location change records associated with a plurality of animals of an animal population — 510 analyze the data repository to check compliance of a subset of the animal population with a population compliance goal — 520

Fig. 6

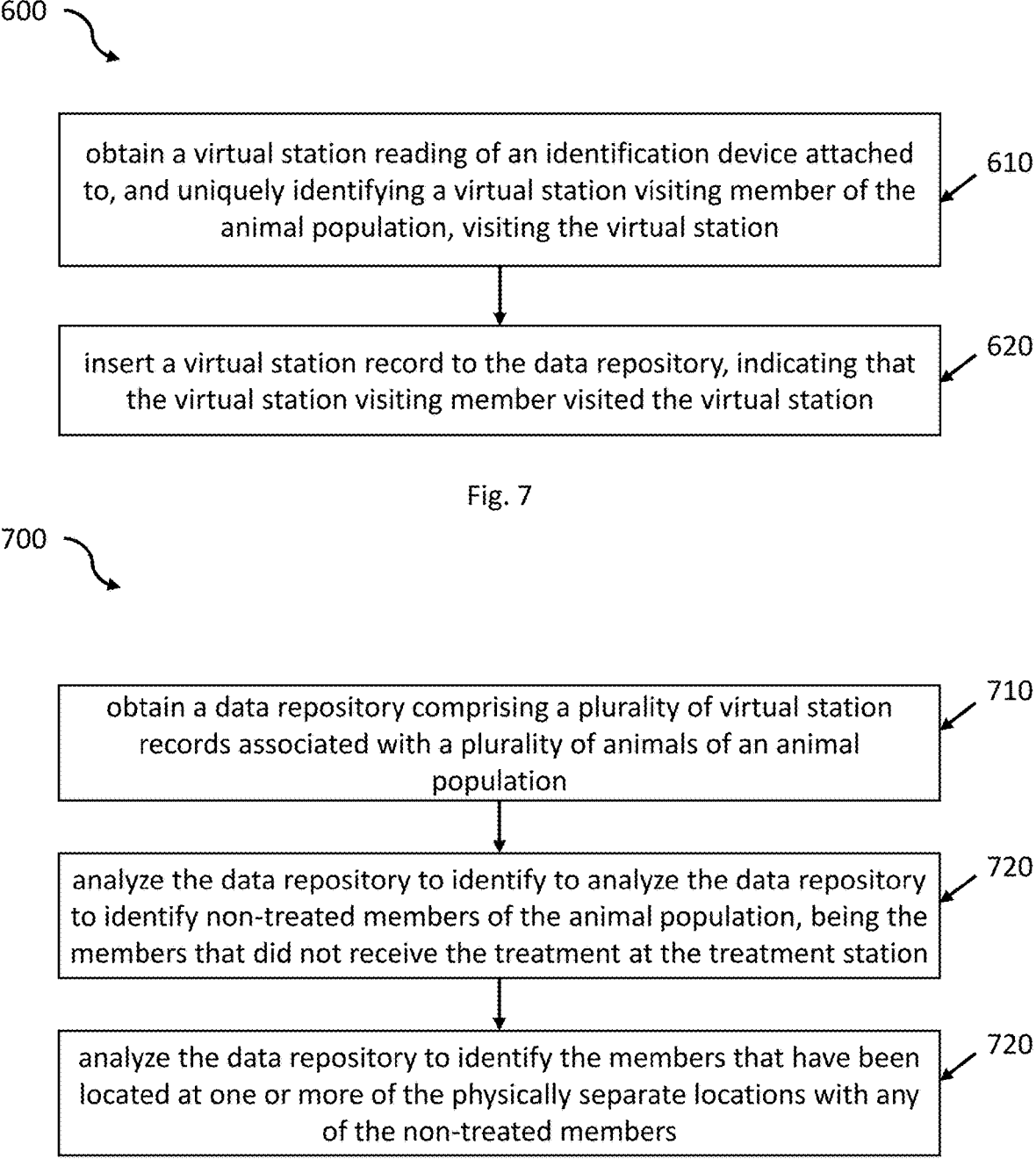

600 obtain a virtual station reading of an identification device attached to, and uniquely identifying a virtual station visiting member of the animal population, visiting the virtual station          610 insert a virtual station record to the data repository, indicating that the virtual station visiting member visited the virtual station          620

Fig. 7

700 obtain a data repository comprising a plurality of virtual station records associated with a plurality of animals of an animal population          710 analyze the data repository to identify to analyze the data repository to identify non-treated members of the animal population, being the members that did not receive the treatment at the treatment station          720 analyze the data repository to identify the members that have been located at one or more of the physically separate locations with any of the non-treated members          720

Fig. 8

SYSTEM AND METHOD FOR TRACING MEMBERS OF AN ANIMAL POPULATION

TECHNICAL FIELD

The presently disclosed subject matter relates to animal traceability, and more specifically to a system and method for tracing members of an animal population.

BACKGROUND

In many cases, animals are moved or transferred between various physically separate locations, whether on the same premise (e.g. between separate areas within a farm) or between premises (e.g. between farms). In some cases, the animals are moved between stations such as saleyards, processing plants, quarantine areas, slaughter houses, etc. In some cases, part of the stations may be located in different countries which requires the animals to be shipped between such locations (e.g. via sea, air or land). In many cases, various regulations exist that define various requirements that relate to animals that are being moved or transferred. Such regulations may vary between different states or countries, different animal types, different intended usages of the animal, etc. In order to determine compliance with the regulatory requirements—having knowledge of the animals' locations over time is a prerequisite.

In addition, in many cases it is desirable to have the ability to determine physical encounters between animals based on their locations. This may be desirable for example in order to break down a chain of infection. In such case, when a certain animal is identified as sick, having the knowledge of those animals that may have been infected from it is valuable. Such knowledge may prevent the need of terminating an entire animal population (e.g. all animal on a certain farm, all animal in a certain shipment, etc.). In addition, such knowledge can save on treatment and vaccination costs (e.g. by improving vaccination records, or by preventing spreading of diseases thereby reducing needed treatments), enable faster and more accurate tracking of disease origins (e.g. by enabling identifying shipments and/or individual animals and associating those with countries of origin, for example if an outbreak occurs there), and enable tracking "patient zero" (e.g. for study purposes).

There is thus a real need in the art for a new system and method for tracing members of an animal population.

GENERAL DESCRIPTION

In accordance with a first aspect of the presently disclosed subject matter, there is provided a system for tracing members of an animal population throughout a process including moving at least some of the members, between (a) a plurality of physically separate locations and (b) one or more virtual stations, in a given order, the system comprising: a plurality of identification devices, each being attached to, and uniquely identifying, a respective member of the members; a plurality of identification device readers, each capable of being located at a respective physically separate location of the physically separate locations, and each capable of reading the identification devices to uniquely identify the respective member; a data repository comprising one or more records, each of the records (i) being associated with a respective member of the members, and (ii) including a unique animal identifier associated with the identification device attached to, and uniquely identifying, the respective member of the members; and a processing circuitry configured to perform the following: (A) upon any given member of the members arriving at any of the physically separate locations, or departing from any of the physically separate locations: obtain a reading of the given member's identification device attached to, and uniquely identifying, the given member, the reading acquired by the identification device reader located at the respective distinct physically separate location; and insert a location change record to the data repository, indicating that the given member arrived at, or departed from, the distinct physically separate location, the location change record including an indication of an arrival time of the given member to the respective distinct physically separate location or the departure time of the given member from the respective distinct physically separate location, thereby enabling tracing the members throughout the process; and (B) upon any given member of the members visiting any of the virtual stations: obtain a virtual station reading of an identification device attached to, and uniquely identifying a virtual station visiting member of the animal population, visiting the virtual station; and insert a virtual station record to the data repository, indicating that the virtual station visiting member visited the virtual station.

In one embodiment of the presently disclosed subject matter and/or embodiments thereof, (a) a given identification device reader of the identification device readers is associated with at least two of the physically separate locations, and (b) an association of each reading acquired by the given identification device reader with a distinct physically separate location of the physically separate locations is performed based on the given order.

In one embodiment of the presently disclosed subject matter and/or embodiments thereof, each virtual station reading is obtained using a respective manual identification device reader associated with the virtual station.

In one embodiment of the presently disclosed subject matter and/or embodiments thereof, (a) the process includes moving at least some of the members between a plurality of virtual stations, (b) a given manual identification device reader is associated with at least two of the virtual stations, and (c) an association of each virtual station reading acquired by the given manual identification device reader with a distinct virtual station of the virtual stations is performed based on the given order.

In one embodiment of the presently disclosed subject matter and/or embodiments thereof, the processing circuitry is further configured to: obtain a population indication request, requesting indications of the members that meet a criterion; analyze the data repository to identify the members that meet the criterion; provide an indication of the members that meet the criterion.

In one embodiment of the presently disclosed subject matter and/or embodiments thereof, the criterion depends on a location of the members.

In one embodiment of the presently disclosed subject matter and/or embodiments thereof, the criterion depends on the location of the members with respect to one or more indicated members of the members.

In one embodiment of the presently disclosed subject matter and/or embodiments thereof, the indicated members are indicated as being sick or as being directly or indirectly associated with a sick member of the members.

In one embodiment of the presently disclosed subject matter and/or embodiments thereof, the processing circuitry is further configured to analyze the data repository to identify non-compliant members of the animal population, wherein (a) the arrival time indicated by one or more of the location change records associated with the non-compliant members fails to meet an arrival time criterion, (b) the departure time indicated by one or more of the location change records associated with the non-compliant members fails to meet a departure time criterion, (c) a stay time lapsing between the arrival time of any given non-compliant member of the non-compliant members to a given distinct physically separate location of the distinct physically separate locations and the departure time of the given non-compliant member from the given distinct physically separate location as indicated by the location change records associated with non-compliant members fails to meet a stay time criterion, or (d) the one or more of the location change records associated with the non-compliant members indicate that the non-compliant members skipped one or more of the plurality of physically separate locations.

In one embodiment of the presently disclosed subject matter and/or embodiments thereof, regulatory requirements define one or more of (a) the arrival time criterion, (b) the departure time criterion, or (c) the stay time criterion.

In one embodiment of the presently disclosed subject matter and/or embodiments thereof, the regulatory requirements are configurable.

In one embodiment of the presently disclosed subject matter and/or embodiments thereof, the regulatory requirements are location specific, so that the regulatory requirements in a first distinct physically separate location of the distinct physically separate locations is different than the regulatory requirements in a second distinct physically separate location of the distinct physically separate locations.

In one embodiment of the presently disclosed subject matter and/or embodiments thereof, the regulatory requirements are determined according to a destination location of the physically separate locations, being a destination location of the animal population.

In one embodiment of the presently disclosed subject matter and/or embodiments thereof, the regulatory requirements are determined according to a type of the animal population.

In one embodiment of the presently disclosed subject matter and/or embodiments thereof, the processing circuitry is further configured to analyze the data repository to check compliance of a subset of the animal population with a population compliance goal, wherein the subset comprising a plurality of the members.

In one embodiment of the presently disclosed subject matter and/or embodiments thereof, (a) the virtual station is a treatment station and, (b) the virtual station visiting member receives treatment at the treatment station, and (c) the virtual station record indicates that the treatment receiving member received the treatment.

In one embodiment of the presently disclosed subject matter and/or embodiments thereof, the processing circuitry is further configured to analyze the data repository to identify non-treated members of the animal population, being the members that did not receive the treatment at the treatment station.

In one embodiment of the presently disclosed subject matter and/or embodiments thereof, the processing circuitry is further configured to analyze the data repository to identify the members that have been located at one or more of the physically separate locations with any of the non-treated members.

In one embodiment of the presently disclosed subject matter and/or embodiments thereof, the processing circuitry is further configured to analyze the data repository to check compliance of a subset of the animal population with a population compliance goal associated with the treatment, wherein the subset comprising a plurality of the members.

In one embodiment of the presently disclosed subject matter and/or embodiments thereof, the non-treated members are the members that did not receive the treatment at the treatment station before moving to a subsequent physically separate location of the physically separate locations.

In one embodiment of the presently disclosed subject matter and/or embodiments thereof, the virtual station reading is obtained by a treatment provider located at the treatment station.

In one embodiment of the presently disclosed subject matter and/or embodiments thereof, at least two of the physically separate locations are located at distinct geographical locations.

In one embodiment of the presently disclosed subject matter and/or embodiments thereof, the identification devices are Electronic Identification Devices (EIDs).

In one embodiment of the presently disclosed subject matter and/or embodiments thereof, the process is selected from a plurality of processes, each defined by a user of the system, and each defining respective process stations, the process stations including a subset of the plurality of physically separate locations, and at least one of the virtual stations, between which the respective animal population is to be moved in a given order.

In one embodiment of the presently disclosed subject matter and/or embodiments thereof, at least two of the processes define respective process stations that partially overlap.

In accordance with a second aspect of the presently disclosed subject matter, there is provided a method for tracing members of an animal population throughout a process including moving at least some of the members between, (a) a plurality of physically separate locations and (b) one or more virtual stations, in a given order, the method comprising: providing: (a) a plurality of identification devices, each being attached to, and uniquely identifying, a respective member of the members; (b) a plurality of identification device readers, each capable of being located at a respective physically separate location of the physically separate locations, and each capable of reading the identification devices to uniquely identify the respective member; and (c) a data repository comprising one or more records, each of the records (i) being associated with a respective member of the members, and (ii) including a unique animal identifier associated with the identification device attached to, and uniquely identifying, the respective member of the members; and performing the following: (A) upon any given member of the members arriving at any of the physically separate locations, or departing from any of the physically separate locations: obtaining a reading of the given member's identification device attached to, and uniquely identifying, the given member, the reading acquired by the identification device reader located at the respective distinct physically separate location; and inserting a location change record to the data repository, indicating that the given member arrived at, or departed from, the distinct physically separate location, the location change record including an indication of an arrival time of the given member to the respective distinct physically separate location or the departure time of the given member from the respective distinct physically separate location, thereby enabling tracing the members throughout the process; and (B) upon any given member of the members visiting any of the virtual stations: obtaining a virtual station reading of an identification device attached to, and uniquely identifying a virtual station visiting member of the animal population, visiting the virtual station; and inserting a virtual station record to the data repository, indicating that the virtual station visiting member visited the virtual station.

In one embodiment of the presently disclosed subject matter and/or embodiments thereof, (a) a given identification device reader of the identification device readers is associated with at least two of the physically separate locations, and (b) an association of each reading acquired by the given identification device reader with a distinct physically separate location of the physically separate locations is performed based on the given order.

In one embodiment of the presently disclosed subject matter and/or embodiments thereof, each virtual station reading is obtained using a respective manual identification device reader associated with the virtual station.

In one embodiment of the presently disclosed subject matter and/or embodiments thereof, (a) the process includes moving at least some of the members between a plurality of virtual stations, (b) a given manual identification device reader is associated with at least two of the virtual stations, and (c) an association of each virtual station reading acquired by the given manual identification device reader with a distinct virtual station of the virtual stations is performed based on the given order.

In one embodiment of the presently disclosed subject matter and/or embodiments thereof, the method further comprises: obtaining a population indication request, requesting indications of the members that meet a criterion; analyzing the data repository to identify the members that meet the criterion; providing an indication of the members that meet the criterion.

In one embodiment of the presently disclosed subject matter and/or embodiments thereof, the criterion depends on a location of the members.

In one embodiment of the presently disclosed subject matter and/or embodiments thereof, the criterion depends on the location of the members with respect to one or more indicated members of the members.

In one embodiment of the presently disclosed subject matter and/or embodiments thereof, the indicated members are indicated as being sick or as being directly or indirectly associated with a sick member of the members.

In one embodiment of the presently disclosed subject matter and/or embodiments thereof, the method further comprises analyzing the data repository to identify non-compliant members of the animal population, wherein (a) the arrival time indicated by one or more of the location change records associated with the non-compliant members fails to meet an arrival time criterion, (b) the departure time indicated by one or more of the location change records associated with the non-compliant members fails to meet a departure time criterion, (c) a stay time lapsing between the arrival time of any given non-compliant member of the non-compliant members to a given distinct physically separate location of the distinct physically separate locations and the departure time of the given non-compliant member from the given distinct physically separate location as indicated by the location change records associated with non-compliant members fails to meet a stay time criterion, or (d) the one or more of the location change records associated with the non-compliant members indicate that the non-compliant members skipped one or more of the plurality of physically separate locations.

In one embodiment of the presently disclosed subject matter and/or embodiments thereof, regulatory requirements define one or more of (a) the arrival time criterion, (b) the departure time criterion, or (c) the stay time criterion.

In one embodiment of the presently disclosed subject matter and/or embodiments thereof, the regulatory requirements are configurable.

In one embodiment of the presently disclosed subject matter and/or embodiments thereof, the regulatory requirements are location specific, so that the regulatory requirements in a first distinct physically separate location of the distinct physically separate locations is different than the regulatory requirements in a second distinct physically separate location of the distinct physically separate locations.

In one embodiment of the presently disclosed subject matter and/or embodiments thereof, the regulatory requirements are determined according to a destination location of the physically separate locations, being a destination location of the animal population.

In one embodiment of the presently disclosed subject matter and/or embodiments thereof, the regulatory requirements are determined according to a type of the animal population.

In one embodiment of the presently disclosed subject matter and/or embodiments thereof, the method further comprises analyzing the data repository to check compliance of a subset of the animal population with a population compliance goal, wherein the subset comprising a plurality of the members.

In one embodiment of the presently disclosed subject matter and/or embodiments thereof, (a) the virtual station is a treatment station and, (b) the virtual station visiting member receives treatment at the treatment station, and (c) the virtual station record indicates that the treatment receiving member received the treatment.

In one embodiment of the presently disclosed subject matter and/or embodiments thereof, the method further comprises analyzing the data repository to identify non-treated members of the animal population, being the members that did not receive the treatment at the treatment station.

In one embodiment of the presently disclosed subject matter and/or embodiments thereof, the method further comprises analyzing the data repository to identify the members that have been located at one or more of the physically separate locations with any of the non-treated members.

In one embodiment of the presently disclosed subject matter and/or embodiments thereof, the method further comprises analyzing the data repository to check compliance of a subset of the animal population with a population compliance goal associated with the treatment, wherein the subset comprising a plurality of the members.

In one embodiment of the presently disclosed subject matter and/or embodiments thereof, the non-treated members are the members that did not receive the treatment at the treatment station before moving to a subsequent physically separate location of the physically separate locations.

In one embodiment of the presently disclosed subject matter and/or embodiments thereof, the virtual station reading is obtained by a treatment provider located at the treatment station.

In one embodiment of the presently disclosed subject matter and/or embodiments thereof, at least two of the physically separate locations are located at distinct geographical locations.

In one embodiment of the presently disclosed subject matter and/or embodiments thereof, the identification devices are Electronic Identification Devices (EIDs).

In one embodiment of the presently disclosed subject matter and/or embodiments thereof, the process is selected from a plurality of processes, each defined by a user of the system, and each defining respective process stations, the process stations including a subset of the plurality of physically separate locations, and at least one of the virtual stations, between which the respective animal population is to be moved in a given order.

In one embodiment of the presently disclosed subject matter and/or embodiments thereof, at least two of the processes define respective process stations that partially overlap.

In accordance with a third aspect of the presently disclosed subject matter, there is provided a non-transitory computer readable storage medium having computer readable program code embodied therewith, the computer readable program code, executable by at least one processing circuitry of a computer to perform a method for tracing members of an animal population throughout a process including moving at least some of the members between, (a) a plurality of physically separate locations and (b) one or more virtual stations, in a given order, the method comprising: providing: (a) a plurality of identification devices, each being attached to, and uniquely identifying, a respective member of the members; (b) a plurality of identification device readers, each capable of being located at a respective physically separate location of the physically separate locations, and each capable of reading the identification devices to uniquely identify the respective member; and (c) a data repository comprising one or more records, each of the records (i) being associated with a respective member of the members, and (ii) including a unique animal identifier associated with the identification device attached to, and uniquely identifying, the respective member of the members; and performing the following: (A) upon any given member of the members arriving at any of the physically separate locations, or departing from any of the physically separate locations: obtaining a reading of the given member's identification device attached to, and uniquely identifying, the given member, the reading acquired by the identification device reader located at the respective distinct physically separate location; and inserting a location change record to the data repository, indicating that the given member arrived at, or departed from, the distinct physically separate location, the location change record including an indication of an arrival time of the given member to the respective distinct physically separate location or the departure time of the given member from the respective distinct physically separate location, thereby enabling tracing the members throughout the process; and (B) upon any given member of the members visiting any of the virtual stations: obtaining a virtual station reading of an identification device attached to, and uniquely identifying a virtual station visiting member of the animal population, visiting the virtual station; and inserting a virtual station record to the data repository, indicating that the virtual station visiting member visited the virtual station.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 2 is a block diagram schematically illustrating one example of a tracing system for tracing members of an animal population, in accordance with the presently disclosed subject matter;

FIG. 3 is a flowchart illustrating one example of a sequence of operations carried out for tracking location changes of animals, in accordance with the presently disclosed subject matter;

FIG. 4 is a flowchart illustrating one example of a sequence of operations carried out for tracing animals, in accordance with the presently disclosed subject matter;

FIG. 5 is a flowchart illustrating one example of a sequence of operations carried out for checking compliance of animals with compliance goals, in accordance with the presently disclosed subject matter;

FIG. 6 is a flowchart illustrating one example of a sequence of operations carried out for checking compliance of an animal population with compliance goals, in accordance with the presently disclosed subject matter;

FIG. 7 is a flowchart illustrating one example of a sequence of operations carried out for tracking visits of animals at virtual stations, in accordance with the presently disclosed subject matter; and FIG. 8 is a flowchart illustrating one example of a sequence of operations carried out for checking compliance of animals with virtual stations compliance goals, in accordance with the presently disclosed subject matter.

DETAILED DESCRIPTION

Figure 1:
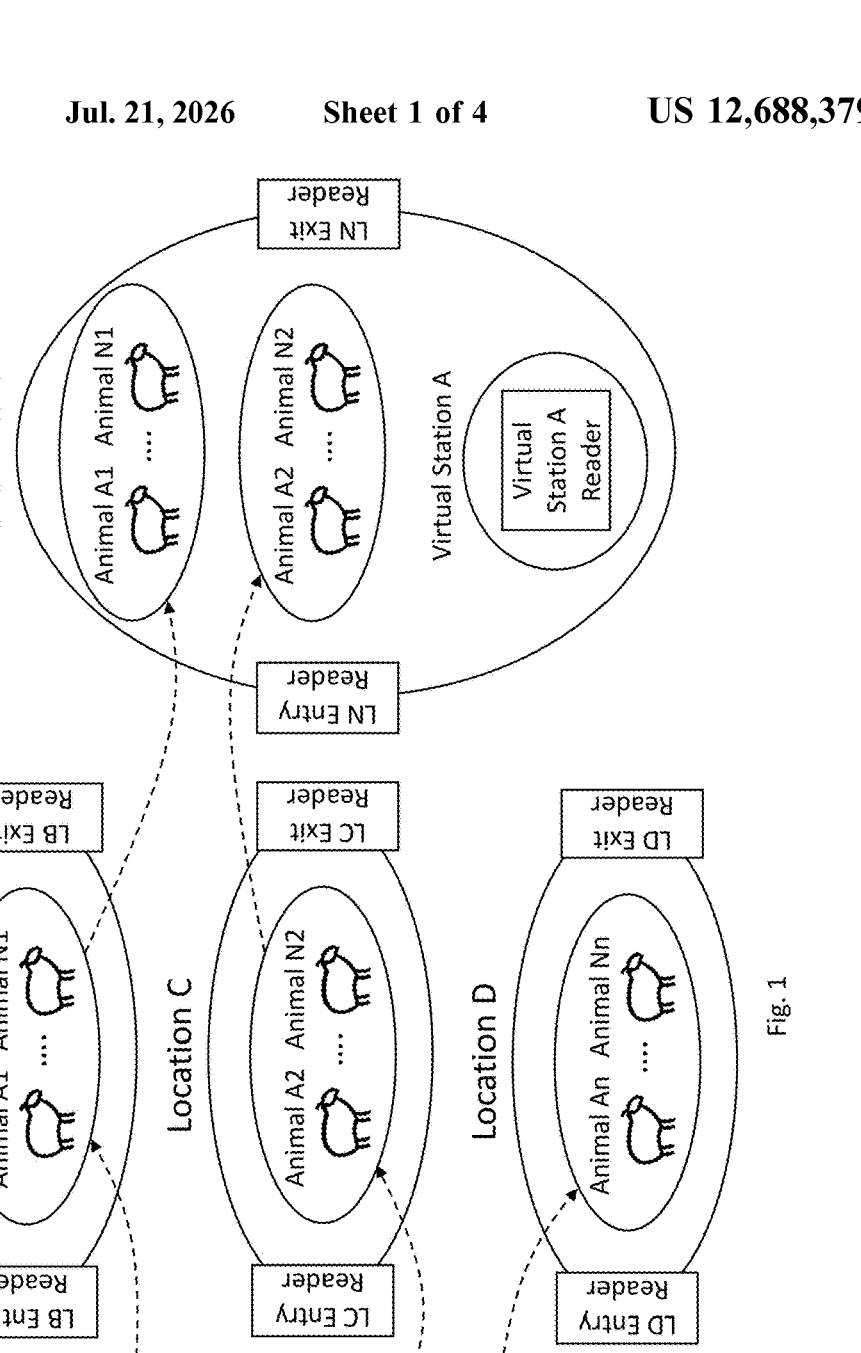
FIG. 1 is a schematic illustration of a system for tracing members of an animal population, in accordance with the presently disclosed subject matter.
Figure 1:
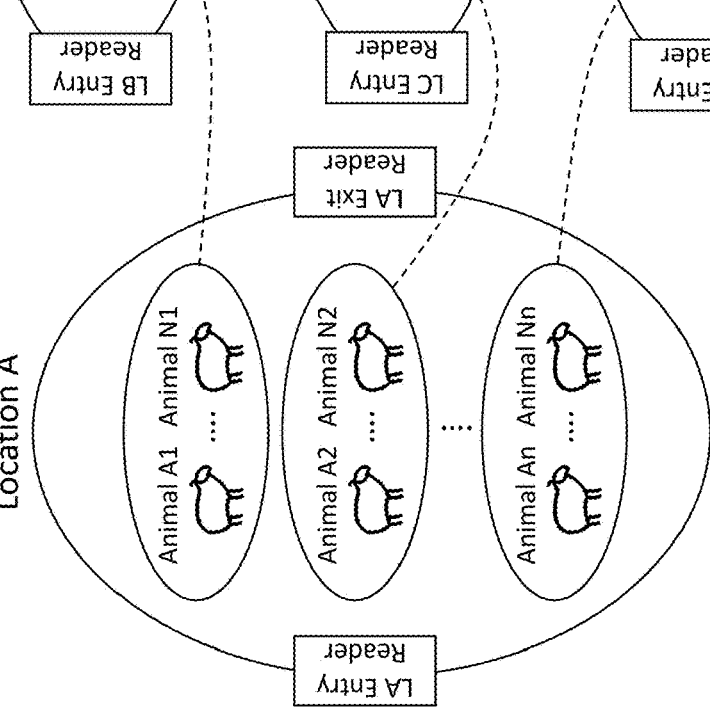

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "inserting", "analyzing", "providing" or the like, include action and/or processes of a computer that manipulate and/or transform data into other data, said data represented as physical quantities, e.g. such as electronic quantities, and/or said data representing the physical objects. The terms "computer", "processor", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 3 to 8 may be executed. In embodiments of the presently disclosed subject matter one or more groups of stages illustrated in FIGS. 3 to 8 may be executed simultaneously. FIGS. 1 and 2 illustrates a general schematic of the system architecture in accordance with an embodiment of the presently disclosed subject matter. Each module in FIGS. 1 and 2 can be made up of any combination of software, hardware and/or firmware that performs the functions as defined and explained herein. The modules in FIGS. 1 and 2 may be centralized in one location or dispersed over more than one location, as detailed herein. In other embodiments of the presently disclosed subject matter, the system may comprise fewer, more, and/or different modules than those shown in FIGS. 1 and 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, which is a schematic illustration of a system for tracing members of an animal population, in accordance with the presently disclosed subject matter.

In accordance with the example illustrated in the figure, a plurality of Locations are shown, namely Location A, Location B, Location C, Location D, . . . , Location N (N being an integer). It is to be noted that the number of locations shown in the illustration is arbitrarily chosen, and any other number of locations greater than one (including thousands or even hundreds of thousands of locations or more) can exist. In certain embodiments, the locations may be physically separate, so that animals that are located at a given location cannot freely move between different locations in accordance with their own free will. Movement of animals between locations may be a controlled process, for example a process that can be controlled by humans and/or machinery (e.g. smart gates that can be controlled by a suitable gate control device such as a computer). Moving an animal includes moving the animal by making it walk between different locations (e.g. between different parts of a farm, noting that the different parts are physically separate and the animals cannot freely move between them), or transferring it between locations (e.g. between farms, domestically or internationally) via a transportation vehicle by land (e.g. using trucks or other suitable vehicles), air e.g. (using airplanes) or sea (e.g. using ships).

The animals are moved between the locations as part of a process. The process can begin at animal birth, or at any later time (e.g. after the animal is tagged by attaching an Electronic Identification (EID) tag that uniquely identified the animal to the animal, or upon arrival of the animal to a given location of the physically separate location in which it is identified and recorded in the system for tracing members of an animal population as further detailed herein). The process can end when the animal arrives at a certain location following which there is no need to continue to trace the animal (e.g. slaughter). During the process, animal movements or transferers between the locations are tracked and recorded for various purposes as further detailed herein.

It is to be noted that various transportation means can also be locations. For example, a transportation means (e.g. a ship, a truck, an airplane, a trailer, etc.) used to transport animals between locations can be regarded as a location itself.

Further in the illustration, a certain animal population is shown to be present in location A. Although the animal 10 in the illustration is illustrated as a sheep, it is by no means limiting, and the animal 10 can be any other animal (e.g. other types of cattle, pets, fish, livestock, etc.), or a combination of various types of animals. The animal population includes a plurality of animals, marked in the illustration as (a) Animal A1, . . . , Animal N1 (N1 being an integer), (b) Animal A2, . . . , Animal N2 (N2 being an integer), (c) . . . , (n) Animal An, . . . , Animal Nn (n and Nn being integers). According to the illustration, the animal processing begins at Location A, however this is by no means limiting, and the animal processing can begin at another location, or at a plurality of additional or alternative locations.

In accordance with the illustration shown in FIG. 1, a first group of animals (namely Animal A1, . . . , Animal N1) is moved to location B, a second group of animals (namely Animal A2, . . . , Animal N2) is moved to location C, and a third group of animals (namely Animal A3, . . . , Animal N3) is moved to location D. It is to be noted that although in the illustration all animals are transferred from Location A to other locations, this is by no means limiting, and some of the animals can remain at Location A and not be moved therefrom to another location. It is to be further noted that in some cases some of the animal that are shown to be located at Location A may originate from other locations from which they have been transferred to Location A. It is to be still further noted that in some cases, although not shown in the illustration, additional animals may be present at Locations B, C and D other than the animals that have been transferred thereto from Location A as shown by the illustration. Such additional animals may originate from Location A, or from any other location.

Looking further at the illustration, it can be appreciated that (a) the animals that have been moved from Location A to Location B (namely Animal A1, . . . , Animal N1) are then moved from Location B to Location N, and (b) the animals that have been moved from Location A to Location C (namely Animal A2, . . . , Animal N2) are then moved from Location C to Location N. It is to be noted that although the illustration shows that the animals are moved directly from Location B to Location N, or from Location C to Location N (i.e. without passing through intermediate locations), this is by no means limiting and the animals can pass through intermediary locations between Locations B or C and Location N.

In order to enable tracking animals between the locations as part of their processing (optionally in real-time or near-real time, e.g. in very short intervals of times, close to instantaneous, or within up to a few seconds), it is required to have the ability to identify them at least once within the location. For example, each animal can be identified upon arrival at each location and/or upon departure from each location and/or at any given time between arrival and departure from each location.

In a certain example, animals are identified upon arrival and upon departure from each location. In such case, each animal that enters a given location has to be identified, and its entry into the given location has to be recorded. Similarly, each animal that leaves a given location has to be identified, and its departure from the given location has to be recorded. For this purpose, each of the physically separate locations includes a respective entry reader and exit reader. The entry readers are configured to identify animals that are entering the respective location, and the exit readers are configured to identify animals that are exiting the respective location. Looking at the illustration: (a) LA entry reader is the entry reader associated with Location A and LA exit reader is the exit reader associated with Location A, (B) LB entry reader is the entry reader associated with Location B and LB exit reader is the exit reader associated with Location B, (c) LC entry reader is the entry reader associated with Location C and LC exit reader is the exit reader associated with Location C, (d) LD entry reader is the entry reader associated with Location D and LD exit reader is the exit reader associated with Location D, . . . , (n) LN entry reader is the entry reader associated with Location N and LN exit reader is the exit reader associated with Location N.

Each of the entry readers is configured to uniquely identify each animal that enters the respective location, and each of the exit readers is configured to uniquely identify each animal that exists the respective location. It is to be noted that the entry readers and/or the exit readers can be manual readers (operated by a user), stationary readers (e.g. monitoring passage of animal through a gate), autonomously driven readers (e.g. carried by autonomous drones), readers incorporated into a mobile device, computer, etc.

For this purpose, in some cases, the animals can have an identification (ID) device (such as, but not limited to, an ID tag such as an EID tag) attached thereto (not shown). The ID device can be a tag that uniquely identifies the animal to which it is attached. However, the ID device may alternatively be another type of device used to identify the animal by any of the methods or systems described herein (including electronic identification, visual identification, camera-based identification, facial or body part recognition, barcode, identification marks, etc.). When read by suitable reading device (e.g. any of the entry readers and/or exit readers), the ID device returns a reading that includes at least a unique animal identifier, uniquely identifying the animal to which it is attached. As discussed, each animal can be identified using various systems/devices/methods/techniques, including an ID tag, identification marks (e.g. digits, letters, symbols, or any combination thereof, etc.), readable barcodes, facial (or other body parts) recognition, etc.

In other cases, all, or part of the animals can be identified without having an ID device attached thereto. One example is visual identification (e.g. facial, or other body parts, recognition). In such cases, the reading devices can be visual reading device such as a camera that acquires images based on which the animals are identified.

It is to be noted that in some cases, one or more of the identification methods may be passive identification methods, such as passive tags. For example, the tags can be a printing of a certain identifier on the animal to be identified, or they can be stickers of a certain visual identifier attached to the animal to be identified, or they can be markings painted on the animal to be identified. In such cases, where the tags are visually identifiable (e.g. barcodes), the respective tag reading device can be, for example, a camera capable of acquiring images in the spectrum of the visual tags.

Returning to the illustration, it is to be noted that the animals are tracked during their processing (optionally in real-time or near-real time). All of the animals that are shown to be located at Location A have been identified upon entering Location A using the LA entry reader (e.g. by reading an ID tag attached to the animals, or using a visual identification, or using any other system and/or identification method). In the specific non-limiting example in which the animals are identified both upon arrival to and upon departure from each location: (a) when the Animals have been identified upon entry to Location A, an indication of their entry into Location A, along with their respective entry time of entering Location A is stored on a data repository (as further detailed herein), and (b) upon each of the animals exiting Location A, it is identified using LA exit reader (e.g. by reading an ID tag attached to the animals, or using a visual identification, or using any other system and/or identification method), an indication of their exit of Location A, along with their respective exit time of exiting Location A is stored on the data repository (as further detailed herein). A similar process occurs at each of the locations:

When animals arrive at location B, they are identified using LB entry reader, and their entry, including the entry time is recorded in the data repository. When animals exit location B, they are identified using LB exit reader, and their exit, including the exit time is recorded in the data repository.

When animals arrive at location C, they are identified using LC entry reader, and their entry, including the entry time is recorded in the data repository. When animals exit location C, they are identified using LC exit reader, and their exit, including the exit time is recorded in the data repository.

When animals arrive at location D, they are identified using LD entry reader, and their entry, including the entry time is recorded in the data repository. When animals exit location D, they are identified using LD exit reader, and their exit, including the exit time is recorded in the data repository.

When animals arrive at location N, they are identified using LN entry reader, and their entry, including the entry time is recorded in the data repository. When animals exit location N, they are identified using LN exit reader, and their exit, including the exit time is recorded in the data repository.

Those records that are stored on the data repository when an animal enters or exists a location are also referred to herein as "location change records".

It is to be noted that in some cases, the entry reader and the exit reader can be the same reader. In such cases, the single reader used to identify the animals when they are arriving and exiting a given location can optionally operate in a first operation mode for identifying arriving animals and a second operation mode for identifying departures. Alternatively, a computerized system can be used in order to discriminate between entries and exits of the animals, using programmed logic. It is to be further noted that in some cases only one of the animal entry time or exit time is tracked (or alternatively instead of the animal entry time or the animal exit time, an indication of an arbitrary time between arrival and departure from each location can be stored, which can also be used to indicate that the animal was processed at such location), and in such cases a single device reader can be used to acquire only a single reading of an animal passing through the respective location. Such configuration however, by itself, may not enable determining a stay time of the animal at the respective location, which is useful information. That said, using a single reader along with an additional sensor (e.g. a video camera) can complement the information obtained by the reader with additional information, such as whether the identified animal is arriving at, or departing from, the location.

Looking at Location N, it can be seen that within the location a virtual station exists, namely Virtual Station A. A virtual station is a station in which all, or some, of the animals are required to pass while staying at a given location. Virtual Station A is a station in which all, or some, of the animals that arrive at location N are required to pass as part of their processing. For example, in some cases, any animal that arrives at Location N has to be vaccinated. The vaccination can be provided at Virtual Station A, within Location N, without the need to move the animal to another location for vaccination. In such cases, the animals can be identified by Virtual Station A Reader, which is configured to uniquely identify the animals that that are being processed at Virtual Station A. Virtual Station A Reader can be a manual identification device reader operated by a human operator, such as a veterinarian for example.

When an animal is processed or arrives at Virtual Station A, it is identified using Virtual Station A reader (e.g. by reading an ID tag attached to the animals, or using a visual identification, or using any other system and/or identification method). When the Animals have been identified upon being processed at Virtual Station A, a suitable indication, along with the processing time is stored on the data repository (as further detailed herein). Those records that are stored on the data repository when an animal is processed at a virtual location are also referred to herein as "virtual station records".

Having described the process of tracing animal populations, it is to be noted that the information that is acquired and stored on the data repository can be used for additional purposes. Some exemplary usages of the data indicative of location changes of the animals include determining the animal welfare (as described in co-pending Patent Application No. 280744 filed in Israel on Feb. 9, 2021), health score, and/or other Key Performance Indicators (KPIs). For example, the time of travel, the type of transportation used, the treatments applied to the animal, and many other parameters can have an effect on the animal welfare. Similarly, the types of treatment and treatment times of the animal can have an effect on the animal health score. Furthermore, information indicative of proximity of an animal to another animal that has been identified as being sick can also have an effect on the animal health score, and so on.

It is to be noted that a user of the system can define, e.g. via a user interface, different processes for different parts of the animal population. Each process defines, for its respective part of the animal population, respective process stations including a subset of the plurality of physically separate locations, and optionally at least one of the virtual stations, between which the respective animal population is to be moved-in a given order. Looking at the figure, the user can define (A) a first process which includes moving Animal A1 to N1 from Location A to Location B, from Location B to Location N, and within Location N to Virtual Station A, (B) a second process which includes moving Animal A2 to N2 from Location A to Location C, from Location C to Location N, and within Location N to Virtual Station A, (C) a third process which includes moving Animal An to Nn from Location A to Location D, or any other process that includes moving animals between process stations (including various physically separate locations and/or virtual stations). Such processes that are defined by the user can be configurable.

In some cases, some of the processes that are defined by the user can partially overlap. When looking at the figure, all processes shown therein partially overlap, as all processes start at Location A. The first process and the second process both end at Location C (or at Virtual Station A). However, all three processes also have a non-overlapping portion: the first process includes moving Animal A1 to N1 via Location B which is not included in the second process, nor in the third process; the second process includes moving Animal A2 to N2 via Location C which is not included in the first process, nor in the third process; the third process includes moving Animal An to Nn to Location D which is not included in the first process, nor in the second process. It is to be noted that in some cases no overlap exists between at least one pair of processes (although not shown in the figure).

In some cases, as part of the definition of the process, the user can also define goals for completion of transfers between process stations. The system can be configured to monitor compliance with such goals, as further detailed herein. It is to be noted that in some cases the goals can be defined by the user based on various regulatory requirements.

Each process station is associated with at least one identification device reader that is used to read the identification device of the animals that pass at the respective process station (be it a physically separate location or a virtual station). In the illustrated example: Location A is associated with LA Entry Reader and LA Exit Reader; Location B is associated with LB Entry Reader and LB Exit Reader; Location C is associated with LC Entry Reader and LC Exit Reader; Location D is associated with LD Entry Reader and LD Exit Reader; Location N is associated with LN Entry Reader and LN Exit Reader; and Virtual Station A is associated with Virtual Station A Reader.

In some cases, a single identification device reader can be associated with a plurality of process stations. For example, LA Exit Reader can be the same identification device reader as LB Entry Reader. Similarly, a single manual identification device reader can be associated with more than one virtual station.

In such cases, where a single identification device reader can be associated with a plurality of process stations, the association of each reading acquired by such identification device reader with the respective process station can be performed based on the order in which the animals are planned to pass through the various process stations as defined by the process (as defined by the user). For example, if the process defines that the Animals A1 to N1 are to be transferred from Location A to Location B, and according to the process Animals A1 to N1 are currently located at Location A, once the identification device reader that is used as both the LA Exit Reader and LB Entry Reader reads the tags of Animals A1 to N1, both an indication that Animals A1 to N1 left Location A and an indication that Animals A1 to N1 entered Location B can be updated in the data repository (in respective location change record/s). In another example, if the process defines that Animals A1 to N1 are required to visit Virtual Station A and afterwards Virtual Station B (not shown in the figure) while in Location N, a single manual identification device reader can be used to read the tags of Animals A1 to N1 when visiting Virtual Stations A and B. In view of the fact that the process defines that the Animals A1 to N1 are required to visit Virtual Station A before Virtual Station B, the first readings obtained from Animals A1 to N1 can be associated with a visit at Virtual Station A and the later readings obtained from Animals A1 to N1 can be associated with a visit at Virtual Station B.

Having described the general process of data collection, attention is now drawn to FIG. 2. FIG. 2 is a block diagram schematically illustrating one example of a tracing system for tracing members of an animal population, in accordance with the presently disclosed subject matter.

Tracing system 100 comprises a network interface 110 (e.g. a network card, a WiFi client, a LiFi client, 3G/4G client, or any other component), enabling tracing system 100 to communicate over a network with external systems from which it obtains information of animal movements and/or animal locations. The external systems can be the entry/exit/virtual station readers themselves, or any other intermediate system(s) that obtain the information about the progress of the animals in their processing (e.g. computerized systems that manage each of the locations and directly communicate with the entry/exit readers).

Tracing system 100 further comprises, or is otherwise associated with, a data repository 120 (e.g. a database, a storage system, a memory including Read Only Memory—ROM, Random Access Memory—RAM, or any other type of memory, etc.) configured to store data, optionally including, inter alia, animal location change records and/or animal virtual station records. Each location change record is associated with a respective distinct animal and can include an indication of a location into which the animal entered or from which the animal exited or in which the animal was processed, and an indication of a corresponding time for either an exit, entrance or processing. Data repository 120 can be further configured to enable retrieval and/or update and/or deletion of the stored data. It is to be noted that in some cases, data repository 120 can be distributed, while the tracing system 100 has access to the information stored thereon, e.g. via a wired or wireless network to which tracing system 100 is able to connect (utilizing its network interface 110).

Tracing system 100 further comprises a processing circuitry 130. Processing circuitry 130 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant tracing system 100 resources and for enabling operations related to tracing system's 100 resources.

Processing circuitry 130 can comprises one or more of the following modules: a location change tracking module 140, a tracing module 150, a virtual station tracking module 160 and a compliance module 170.

Location change tracking module 140, can be configured to track location change of animal during their processing (optionally in real-time or near-real time), as further detailed herein, inter alia with reference to FIG. 3.

Tracing module 150 is configured to perform a process for tracing animals, as further detailed herein, inter alia with reference to FIG. 4.

Virtual station tracking module 160 is configured to perform a process for tracking visits of animals at virtual stations, as further detailed herein, inter alia with reference to FIG. 7.

Compliance module 170 is configured to perform one or more processes for checking compliance of animals with various compliance requirements, as further detailed herein, inter alia with reference to FIGS. 5, 6 and 8. Some exemplary compliance requirements include: number of days in quarantine, getting a vaccine/medication, getting a vaccine/medication within a certain period of time from a triggering event, group size, average number of individual animals meeting certain criteria, animal weight thresholds, etc.

Turning to FIG. 3, there is shown a flowchart illustrating one example of a sequence of operations carried out for tracking location changes of animals, in accordance with the presently disclosed subject matter.

In accordance with the presently disclosed subject matter, tracing system 100 can be configured to perform location change tracking process 200 (optionally in real-time or near-real time), e.g. using location change tracking module 140. For this purpose, tracing system 100 is configured to obtain a reading of an identification device attached to, and uniquely identifying, a given member of an animal population to be tracked, the reading acquired by an identification device reader located at a respective given location (being a distinct physically separate location, distinct and physically separate from other locations) (block 210). It is to be noted that, as indicated herein, in some cases the animal can be identified using other identification systems and/or methods that enable uniquely identifying the animals of the animal population.

Upon obtaining the reading at block 210, tracing system 100 inserts a location change record to the data repository 120, indicating that the given member arrived at, or departed from, the given location (block 220). The location change record includes an indication of an arrival time of the given member to the given location or the departure time of the given member from the given location, thereby enabling tracing the members throughout the process. It is to be noted that the reading time, indicative of the arrival/departure time of the animal to/from the given location, can accompany the reading obtained at block 210, optionally along with additional information.

As indicated herein, with reference to FIG. 1, each animal is identified at least once in each location in which it is required to pass as part of its processing. The animal can be identified (a) upon arrival at a given location in which it is to be processed (according to a processing need thereof), or (b) upon exiting the given location in which it is to be processed. In some cases, the animal is identified both upon arrival to the given location in which it is to be processed and upon exiting the given location in which it is to be processed, and in further embodiments, the animal may be identified during its stay in a given location.

Accordingly, in certain embodiments, when an animal arrives at the given location, it is identified (e.g. using an entry reader associated with the given location), and a location change record can be generated, indicating that the animal arrived at the given location, and indicating its arrival time at the given location. Similarly, when an animal exits the given location, it is identified (e.g. using an exit reader associated with the given location), and a location change record can be generated, indicating that the animal exited the given location and indicating its exit time from the location.

It is to be noted that in some cases an animal is identified only once in one or more of the locations in which it is processed, and in such cases, a single location change record is stored indicating that it passed through the given location at a given passage time in which it was identified by the respective reader.

It is to be noted, with reference to FIG. 3, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Attention is now drawn to FIG. 4, a flowchart illustrating one example of a sequence of operations carried out for tracing animals, in accordance with the presently disclosed subject matter.

In accordance with the presently disclosed subject matter, tracing system 100 can be configured to perform an animal tracing process 300 (optionally in real-time or near-real time), e.g. using tracing module 150. For this purpose, tracing system 100 is configured to obtain a population indication request, requesting indications of members of the tracked animal population that meet a criterion (block 310) and to analyze the data repository to identify the members that meet the criterion (block 320).

The information of the location changes of the animals in the animal population as obtained by the location change tracking process 200 enables tracking animal progress throughout the animal processing, as well as tracking interactions between animals (e.g. by determining which animals were located at a given location and which other animals are also located there at the same time).

The criterion mentioned in block 310 can depend on a location of the members. For example, the criterion can be a location from which the members originate or in which the members passed, at any time, or during a given time window.

Looking at a specific example, a user of the tracing system 100 may be interested in locating all members of the animal population that originate from Location A. In such case, the tracing system 100 will analyze the data repository 120 to identify which members of the animal population started their processing in Location A.

Looking at another example, a user of the tracing system 100 may be interested in locating all members of the animal population that passed through Location C. In such case, the tracing system 100 will analyze the data repository 120 to identify which members of the animal population passed through Location C. In some cases, the user may be interested in locating all members of the animal population that passed through Location C during a certain time period (for example a certain year). In such case, the tracing system 100 will analyze the data repository 120 to identify which members of the animal population passed through Location C during 2020.

Clearly the criterion can be much more granular. For example, a user of the tracing system 100 may be interested in locating all members of the animal population that originate from Location A, passed through Location C, and arrived at Location N during the last ten days. In such case, the tracing system 100 will analyze the data repository 120 to identify which members of the animal population that originate from Location A, passed through Location C, and arrived at Location N during the last ten days. The tracing system 100 can optionally provide an indication as to the current location of such animals, optionally in real-time or near-real-time.

In even more complicated cases, the criterion can also refer to virtual station visits of the members of the animal population determined according to virtual station records (as further detailed with reference to FIG. 7). For example, a user of the tracing system 100 may be interested in identifying all the animal that are currently located at Location N, that passed through Location B and did not pass through virtual station A. For example, assuming that according to regulations that apply at Location N, animals that pass-through Location B (which can be a certain country) must be vaccinated with a specific vaccine. Accordingly, the tracing system 100 has ability to identify those animals that arrived at Location N after passing through Location B and did not receive vaccine within a certain time window since their arrival.

In some cases, the criterion mentioned in block 310 can depend on the location of the members with respect to one or more indicated members of the members. For example, a user of the tracing system 100 may be interested in locating all members of the animal population that have been located with the indicated members (being one or more specific animals identified using their unique identifier).

In a specific example, the indicated members are indicated as being sick or as being directly or indirectly associated with a sick member of the animals (members that have been located with a sick animal in one of the locations, members that have been located with other members that were located with a sick animal in one of the locations, etc.). Clearly, having the ability to identify all members of the animal population that may have been affected by a sick animal is crucial and may prevent a need to terminate an entire animal population. Assuming that a given animal was identified as sick with a viral disease, having information of its locations and the locations of the other members of the animal population enables identifying those animals of the animal population that may have been infected by the sick animal. Infection can be direct (by the given animal directly infecting animals that were located with the sick animal in a given location), or indirect (by the given animal infecting another animal that later infects another animal, and so on).

In some cases, the criterion can be a shipment identifier, identifying a specific shipment of a group of members of the animal population between locations. In such cases, a user of the tracing system 100 may be interested in identifying the locations of all members of the animal population that have been shipped in the shipment identified by the shipment identifier.

Tracing system 100 can be further configured to provide an indication of the members that meet the criterion (block 330). Such indication can be provided via any output device, such as: a display or indication mechanisms attached to the animal population (e.g. each animal may have an indication mechanism, such as a light source, a speaker, etc., and the indication mechanisms of the members that meet the criterion may be activated to identify the members that meet the criteria).

It is to be noted, with reference to FIG. 4, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Attention is drawn to FIG. 5, a flowchart illustrating one example of a sequence of operations carried out for checking compliance of animals with compliance goals, in accordance with the presently disclosed subject matter.

In accordance with the presently disclosed subject matter, tracing system 100 can be configured to perform an animal compliance check process 400, e.g. using compliance module 170. For this purpose, tracing system 100 is configured to obtain a data repository 120 comprising a plurality of location change records associated with a plurality of animals of an animal population (block 410).

Tracing system 100 is further configured to analyze the data repository 120 to identify non-compliant members of the animal population that fail to meet one or more compliance goals (block 420). The compliance goals can include definitions of arrival time goals of arriving at one or more of the locations, departure time goals of departing from one or more of the locations, stay times in one or more of the locations, required passages at one or more of the locations, vaccination/medication requirements (optionally including timing requirements such as getting the vaccination/medication within a certain period of time from a triggering event such as arrival time), health requirements, quarantine requirements (e.g. number of days in quarantine), population size (e.g. number of animals within a population or a sub-group of animals of the animal population), average number of individual animals meeting certain criteria, animal weight thresholds, etc.

Some example of non-compliant members: (a) the arrival time indicated by one or more of the location change records associated with the non-compliant members fails to meet an arrival time criterion (indicating that the non-compliant members failed to arrive at a given location on time), (b) the departure time indicated by one or more of the location change records associated with the non-compliant members fails to meet a departure time criterion (indicating that the non-compliant members failed to depart from a given location on time), (c) a stay time lapsing between the arrival time of any given non-compliant member of the non-compliant members to a given distinct physically separate location of the distinct physically separate locations and the departure time of the given non-compliant member from the given distinct physically separate location as indicated by the location change records associated with non-compliant members fails to meet a stay time criterion (indicating that the non-compliant members over stayed or under stayed at a given location), or (d) the one or more of the location change records associated with the non-compliant members indicate that the non-compliant members skipped one or more of the plurality of physically separate locations (indicating that the non-compliant members did not pass through a given location that they were required to pass through).

In some cases, regulatory requirements define one or more of (a) the arrival time criterion, (b) the departure time criterion, or (c) the stay time criterion. In some cases, the tracing system 100 enables configuring regulatory requirements (e.g. by a user of the system).

It is to be noted that the regulatory requirements can be location specific, so that the regulatory requirements in a first location (a first distinct physically separate location) of a plurality of distinct physically separate locations is different than the regulatory requirements in a second location (a second distinct physically separate location) of the distinct physically separate locations.

In some cases, the regulatory requirements can be determined according to a destination location of the physically separate locations, being a destination location of the animal population. Assuming for example, that a first group of animals of an animal population is designated to a first country, and a second group of animals of the animal population is designated to a second country, the regulatory requirements that the first group of animals are subject to are defined according to a regulator of the first country, whereas the regulatory requirements that the second group of animals are subject to are defined according to a regulator of the second country.

In some cases, the regulatory requirements can be determined according to a type of the animal population. Assuming for example, that a first group of animals of an animal population include cows for slaughter, and a second group of animals of the animal population include dairy cows, the regulatory requirements that the first group of animals are subject to can be different than the regulatory requirements that the second group of animals are subject to.

It is to be noted, with reference to FIG. 5, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

FIG. 6 is a flowchart illustrating one example of a sequence of operations carried out for checking compliance of an animal population with compliance goals, in accordance with the presently disclosed subject matter.

In accordance with the presently disclosed subject matter, tracing system 100 can be configured to perform an animal population compliance check process 500, e.g. using compliance module 170. For this purpose, tracing system 100 is configured to obtain a data repository 120 comprising a plurality of location change records associated with a plurality of animals of an animal population (block 510).

Tracing system 100 is further configured to analyze the data repository 120 to check compliance of a subset of the animal population with a population compliance goal (block 520). It is to be noted that compliance can be measured on a group level (e.g. a subset of the animal population that meet a certain criterion (located at a certain location, originate from a certain location, designated to a certain location, etc.), the entire animal population, etc.), instead of, or in addition to, compliance measurements on an individual animal level. In such cases, it is desirable to check if a group of animals of the animal population met compliance goals. For example, a certain compliance goal may indicate that at least 20% of the animal population on Location N are required to be animals that originate from Location A. Tracing system 100 can continuously monitor the animal population in Location A in order to verify that the goal is met. In those cases that the goal is not met—tracing system 100 can be configured, for example, to provide a suitable notification to a user thereof.

It is to be noted, with reference to FIG. 6, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

FIG. 7 is a flowchart illustrating one example of a sequence of operations carried out for tracking visits of animals at virtual stations, in accordance with the presently disclosed subject matter.

In accordance with the presently disclosed subject matter, tracing system 100 can be configured to perform an animal virtual stations visits tracking process 600, e.g. using location change tracking module 140. For this purpose, tracing system 100 is configured to obtain a virtual station reading of an identification device attached to, and uniquely identifying a virtual station visiting member of the animal population, visiting the virtual station (block 610). It is to be noted that, as indicated herein, in some cases the animal can be identified using other identification systems and/or methods that enable uniquely identifying the animals of the animal population.

As indicated herein, a virtual station is a station in which all, or some, of the animals are required to pass while staying at a given location. Looking at FIG. 1 for example, Virtual Station A is a station in which all, or some, of the animals that arrive at location N are required to pass as part of their processing. For example, in some cases, any animal that arrives at Location N has to be vaccinated. The vaccination can be provided at Virtual Station A, within Location N, without the need to move the animal to another location for vaccination. In such cases, the animals can be identified by Virtual Station A Reader, which is configured to uniquely identify the animals that that are being processed at Virtual Station A. Virtual Station A Reader can be a manual identification device reader operated by a human operator, such as a veterinarian for example.

Upon each of the animals arriving at, or being processed at, Virtual Station A, it is identified using Virtual Station A reader (e.g. by reading an ID tag attached to the animals, or using a visual identification, or using any other system and/or identification method).

Tracing system 100 is further configured to insert a virtual station record to the data repository, indicating that the virtual station visiting member visited the virtual station (block 620). The virtual station record can include an indication of a time of visit of the respective animal at the virtual station thereby enabling tracing animal visits at the virtual stations. It is to be noted that the reading time, indicative of the visit time of the animal at the virtual station, can accompany the reading obtained at block 610, optionally along with additional information.

In some cases, the virtual station can be a treatment station (e.g. a station in which animals gets: vaccinated, medicated, x-rayed, scanned, inseminated, or gets any vet operation, nutritionist operation, farmer operation, regulatory operation, or commercial operation). In such cases, the virtual station visiting member (the animal that visits the virtual station) receives treatment at the treatment station, and the virtual station record indicates that the treatment receiving member received the treatment. In such cases, the virtual station reading can be obtained by a treatment provider (e.g. a veterinarian) located at the treatment station. In some cases, the virtual station reading can be obtained by a treatment provider using a manual identification device reader capable of identifying the animal receiving the treatment (e.g. by reading an identification tag attached thereto, or in any other manner).

It is to be noted, with reference to FIG. 7, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

FIG. 8 is a flowchart illustrating one example of a sequence of operations carried out for checking compliance of animals with virtual stations compliance goals, in accordance with the presently disclosed subject matter.

In accordance with the presently disclosed subject matter, tracing system 100 can be configured to perform an animal virtual station compliance process 700, e.g. using compliance module 170. For this purpose, tracing system 100 is configured to obtain a data repository 120 comprising a plurality of virtual station records associated with a plurality of animals of an animal population (block 710).

Tracing system 100 is further configured to analyze the data repository 120 to identify non-treated members of the animal population, being the members that did not receive the treatment at the treatment station (block 720). As indicated herein, a virtual station can be a treatment station. In such cases, the virtual station records that have been acquired via process 600, can be used in order to identify animals of the animal population that did not receive treatment at a treatment station, t.

It is to be noted that in some cases, the non-treated members are the members of the animal population that did not receive the treatment at the treatment station at required times (e.g. before moving to a subsequent location (e.g. a subsequent physically separate location of a plurality of physically separate locations) subsequent to the treatment station).

In some cases, tracing system 100 can be further configured to analyze the data repository 120 to identify the members that have been located at one or more of the physically separate locations with any of the non-treated members. . . . In some cases, tracing system 100 can be further configured to provide a suitable notification enabling identification of such non-treated members to a user thereof.

Tracing system 100 can be further configured to analyze the data repository 120 to check compliance of a subset of the animal population with a population compliance goal associated with the treatment. It is to be noted that compliance can be measured on a group level, instead of, or in addition to, compliance measurements on an individual animal level. In such cases, it is desirable to check if a group of animals of the animal population met compliance goals. For example, a certain compliance goal may indicate that at least 75% of the animals that arrive at Location N must be vaccinated within 5 hours of arrival to Location N. Tracing system 100 can continuously monitor the animal population in Location N in order to verify that the goal is met. In those cases that the goal is not met—tracing system 100 can be configured, for example, to provide a suitable notification to a user thereof.

It is to be noted, with reference to FIG. 8, that some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed methods. The presently disclosed subject matter further contemplates a machine-readable memory tangibly embodying a program of instructions executable by the machine for executing the disclosed methods.

The invention claimed is:

1. A system for tracing members of an animal population throughout a process including moving at least some of the members, between (a) a plurality of physically separate locations and (b) one or more virtual stations, in a given order, the system comprising:

a data repository comprising one or more location change records, each of the records: (i) being associated with a respective member of the members, and (ii) including a unique animal identifier associated with the identification device attached to, and uniquely identifying, the respective member of the members, (iii) indicating a time of arrival, or a time pf of departure, of the respective member, to, or from, a given physically separate location of the physically separate locations, or a given virtual station of the virtual stations, thereby enabling tracing the members throughout the process; and a processing circuitry configured to perform at least one of the following:

(a) analyze the data repository to check compliance of a subset of the animal population with a population compliance goal, wherein the subset comprising a plurality of the members; or (b) (i) obtain a population indication request, requesting indications of the members that meet a criterion, (ii) analyze the data repository to identify the members that meet the criterion, and (iii) provide an indication of the members that meet the criterion.

2. The system of claim 1, wherein (a) at least one of the virtual stations is a treatment station and, (b) upon any given member of the members visiting the treatment station the given member receives treatment, and (c) the location change record associated with the given member's visit in the treatment station indicates that the given member received the treatment.

3. The system of claim 2, wherein the processing circuitry is further configured to analyze the data repository to identify non-treated members of the animal population, being the members that did not receive the treatment at the treatment station.

4. The system of claim 3, wherein the processing circuitry is further configured to analyze the data repository to identify the members that have been located at one or more of the physically separate locations with any of the non-treated members.

5. The system of claim 2, wherein the population compliance goal is associated with the treatment.

6. The system of claim 1, wherein the criterion depends on a location of the members.

7. The system of claim 6, wherein the criterion depends on the location of the members with respect to one or more indicated members of the members.

8. The system of claim 7, wherein the indicated members are indicated as being sick or as being directly or indirectly associated with a sick member of the members.

9. The system of claim 1, wherein the process is selected from a plurality of processes, each defined by a user of the system, and each defining respective process stations, the process stations including a subset of the plurality of physically separate locations, and at least one of the virtual stations, between which the respective animal population is to be moved in a given order.

10. The system of claim 9, wherein at least two of the processes define respective process stations that partially overlap.

11. A method for tracing members of an animal population throughout a process including moving at least some of the members, between (a) a plurality of physically separate locations and (b) one or more virtual stations, in a given order, the method comprising:

providing a data repository comprising one or more location change records, each of the records: (i) being associated with a respective member of the members, and (ii) including a unique animal identifier associated with the identification device attached to, and uniquely identifying, the respective member of the members, (iii) indicating a time of arrival, or a time pf of departure, of the respective member, to, or from, a given physically separate location of the physically separate locations, or a given virtual station of the virtual stations, thereby enabling tracing the members throughout the process; and performing at least one of the following:

(a) analyzing, by a processing circuitry, the data repository to check compliance of a subset of the animal population with a population compliance goal, wherein the subset comprising a plurality of the members; or (b) (i) obtaining, by the processing circuitry, a population indication request, requesting indications of the members that meet a criterion, (ii) analyzing, by the processing circuitry, the data repository to identify the members that meet the criterion, and (iii) providing, by the processing circuitry, an indication of the members that meet the criterion.

12. The method of claim 11, wherein (a) at least one of the virtual stations is a treatment station and, (b) upon any given member of the members visiting the treatment station the given member receives treatment, and (c) the location change record associated with the given member's visit in the treatment station indicates that the given member received the treatment.

13. The method of claim 12, further comprising analyzing, by the processing circuitry, the data repository to identify non-treated members of the animal population, being the members that did not receive the treatment at the treatment station.

14. The method of claim 13, wherein the processing circuitry is further configured to analyze the data repository to identify the members that have been located at one or more of the physically separate locations with any of the non-treated members.

15. The method of claim 12, wherein the population compliance goal is associated with the treatment.

16. The method of claim 11, wherein the criterion depends on a location of the members.

17. The method of claim 16, wherein the criterion depends on the location of the members with respect to one or more indicated members of the members.

18. The method of claim 17, wherein the indicated members are indicated as being sick or as being directly or indirectly associated with a sick member of the members.

19. The method of claim 11, wherein the process is selected from a plurality of processes, each defined by a user of the system, and each defining respective process stations, the process stations including a subset of the plurality of physically separate locations, and at least one of the virtual stations, between which the respective animal population is to be moved in a given order.

20. A non-transitory computer readable storage medium having computer readable program code embodied therewith, the computer readable program code, executable by at least one processing circuitry of a computer to perform a method for tracing members of an animal population throughout a process including moving at least some of the members, between (a) a plurality of physically separate locations and (b) one or more virtual stations, in a given order, the method comprising:

providing a data repository comprising one or more location change records, each of the records: (i) being associated with a respective member of the members, and (ii) including a unique animal identifier associated with the identification device attached to, and uniquely identifying, the respective member of the members, (iii) indicating a time of arrival, or a time pf of departure, of the respective member, to, or from, a given physically separate location of the physically separate locations, or a given virtual station of the virtual stations, thereby enabling tracing the members throughout the process; and performing at least one of the following:

(a) analyzing, by a processing circuitry, the data repository to check compliance of a subset of the animal population with a population compliance goal, wherein the subset comprising a plurality of the members; or (b) (i) obtaining, by the processing circuitry, a population indication request, requesting indications of the members that meet a criterion, (ii) analyzing, by the processing circuitry, the data repository to identify the members that meet the criterion, and (iii) providing, by the processing circuitry, an indication of the members that meet the criterion.

\* \* \* \* \*